United States Patent [19]

Hasuo

[11] Patent Number: 5,363,504
[45] Date of Patent: Nov. 8, 1994

[54] ELECTRONIC FILING METHOD AND APPARATUS

[75] Inventor: Kamon Hasuo, Kawasaki, Japan

[73] Assignee: Canon Kabushiki Kaisha, Tokyo, Japan

[21] Appl. No.: 79,854

[22] Filed: Jun. 22, 1993

Related U.S. Application Data

[63] Continuation of Ser. No. 478,250, Feb. 9, 1990, abandoned.

[30] Foreign Application Priority Data

| | | | |
|---|---|---|---|
| Feb. 9, 1989 | [JP] | Japan | 1-30794 |
| Jun. 2, 1989 | [JP] | Japan | 1-140628 |
| Jun. 2, 1989 | [JP] | Japan | 1-140629 |
| Jun. 2, 1989 | [JP] | Japan | 1-140630 |

[51] Int. Cl.$^5$ .................................. G06F 7/00
[52] U.S. Cl. ..................... 395/600; 364/DIG. 1; 364/252.4
[58] Field of Search ......................... 364/252.4

[56] References Cited

U.S. PATENT DOCUMENTS

4,808,987 2/1989 Takeda et al. ............... 340/721
4,899,292 2/1990 Montagna et al. ........... 364/521

*Primary Examiner*—Gareth D. Shaw
*Assistant Examiner*—Abdolla Katbab
*Attorney, Agent, or Firm*—Fitzpatrick, Cella, Harper & Scinto

[57] ABSTRACT

A filing method and apparatus for an electronic filing apparatus. The method includes the steps of reading out index images from an index image storage and displaying the read-out index images on a display having a plurality of display locations. Each of the index images is an image representative of index information used for retrieving image information to be stored in a storage medium and capable of being used as index information for a plurality of image information. Desired index images are selected from among the plurality of index images displayed at the plurality of display locations and the image information to be stored in the storage medium is input and stored in a vacant area of the storage medium. An index file is formed indicating a relationship between the index images selected and a storage address of the image information stored in the storage medium.

17 Claims, 31 Drawing Sheets

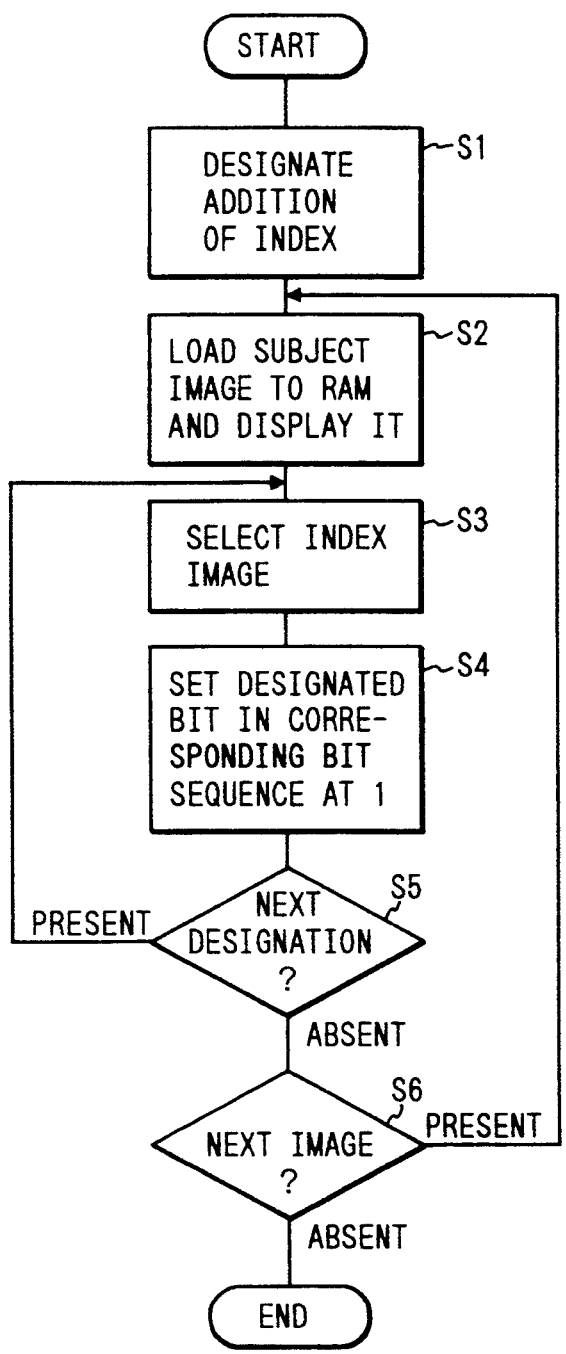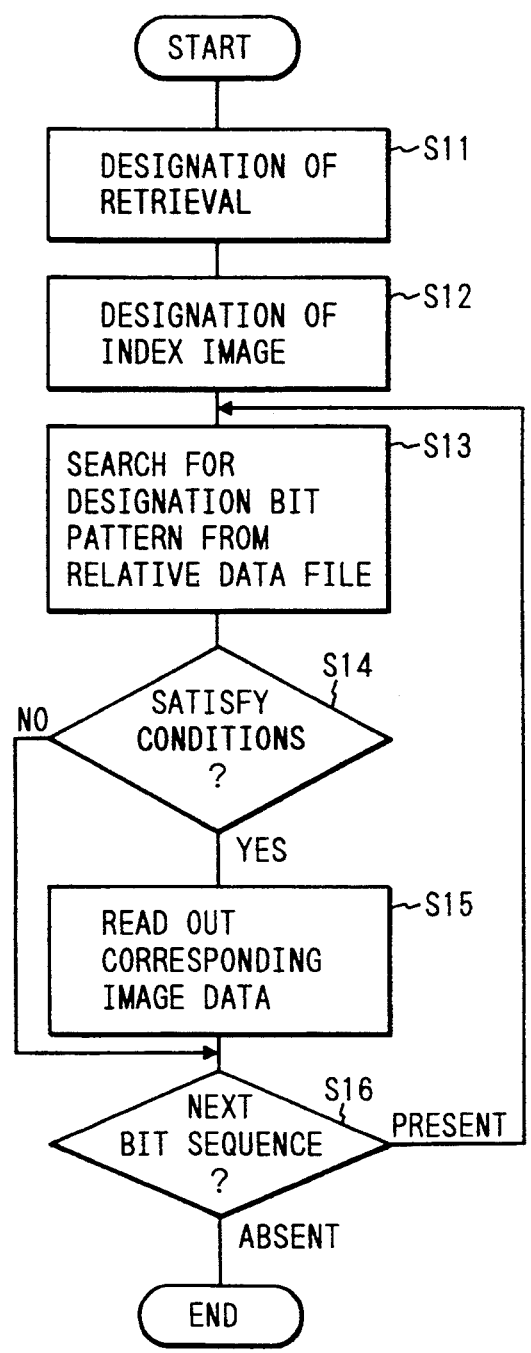

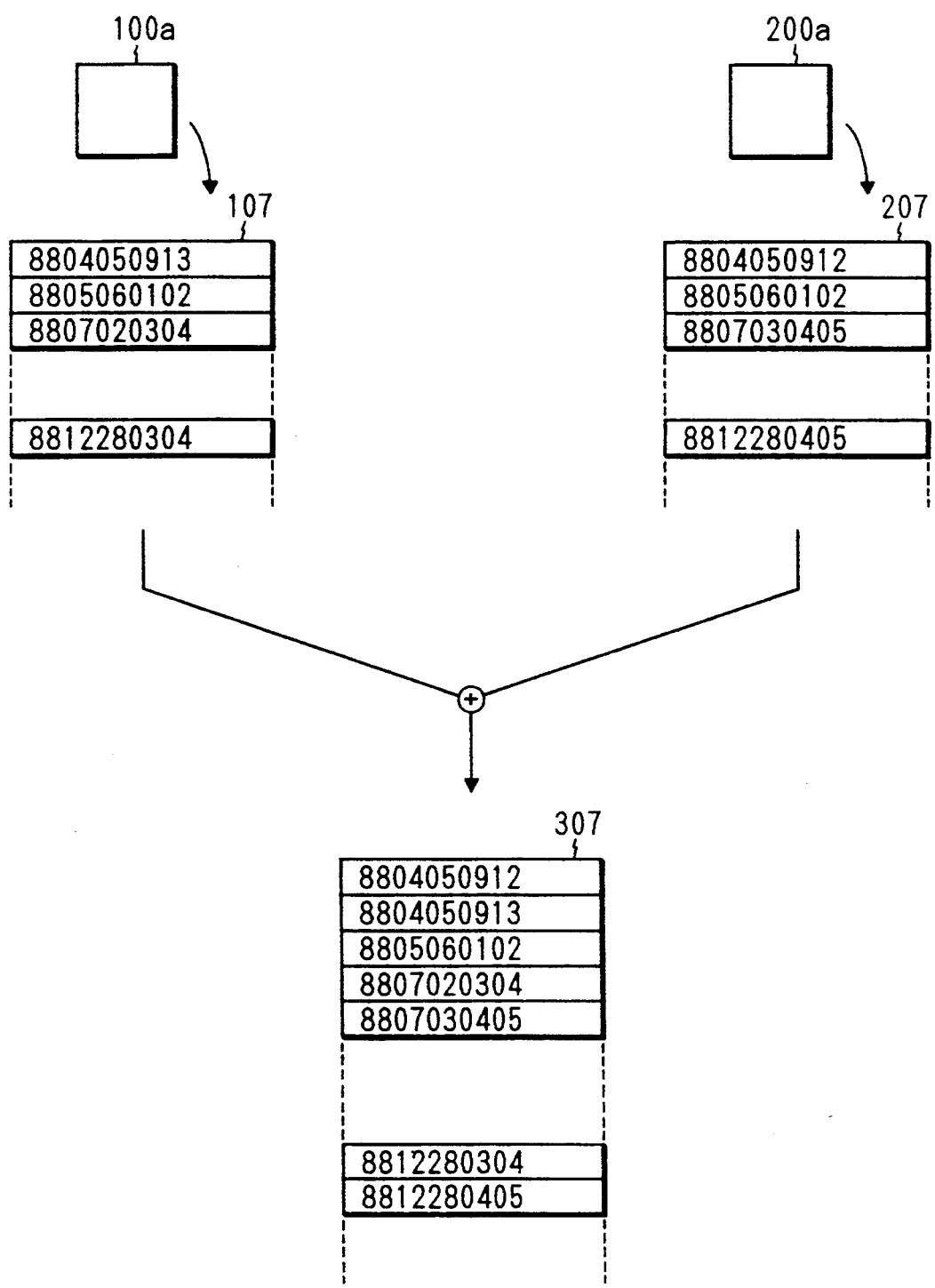

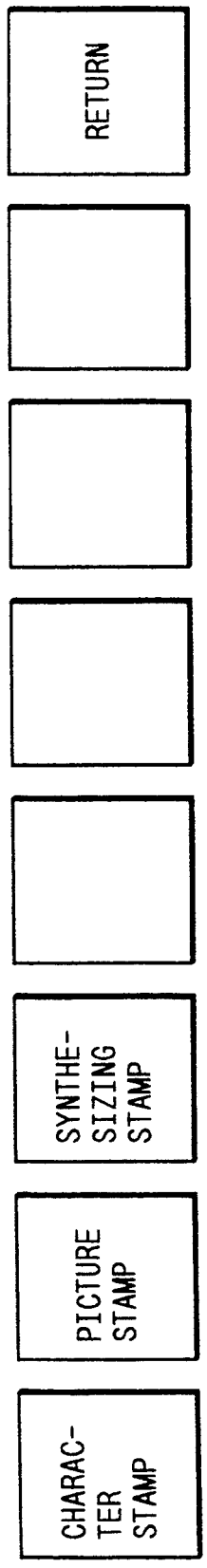

MAY. 28, 1989   13HR. 40MIN. 00SEC.

| K(1,1) ♀ | K(1,2) ☎ | K(1,3) FAX | K(1,4) | K(1,5) |
| K(2,1) A SECTION | K(2,2) B SECTION | K(2,3) C SECTION | K(2,4) D SECTION | K(2,5) |
| K(3,1) ☆ | K(3,2) ◎ | K(3,3) ※ | K(3,4) | K(3,5) |
| K(4,1) △△△ | K(4,2) ✂ | K(4,3) ♠ | K(4,4) | K(4,5) |

KEYWORD :
KEY NUMBER :
DATE ID :  ?
IMAGE ID :  ?
RESIDUAL AMOUNT OF DISK : 1228

| STAMP SELECTION | STAMP SELECTION | STAMP SELECTION | STAMP SELECTION | STAMP SELECTION | DECISION | RETRIEVAL EXECUTION | RETURN |

54 : DISPLAY APPARATUS

55

| K1 | K2 | K3 | K4 | K5 | K6 | K7 | K8 |

ELECTRONIC FILING METHOD AND APPARATUS

This application is a continuation, of application Ser. No. 07/478,250 filed Feb. 9, 1990, which is now abandoned.

BACKGROUND OF THE INVENTION

1. Field of the Invention

This invention relates to the registration of retrieval data in an electronic data filing apparatus.

2. Related Background Art

In prior art memory apparatus having a data retrieval function, data retrieval is carried out using retrieval data such as data file name, keyword corresponding to stored data and code number provided according to a predetermined rule. The retrieval data is produced according to data designated by a keyboard or the like.

When data retrieval in the prior art apparatus is carried out using file name, one file can not be given many characters, and it is impossible to permit various types of retrieval.

Where a keyword is used for retrieval, a great deal of man-hour is required for the selection of keyword. In addition, it is difficult to designate an adequate keyword at the time of retrieval because there are many different words representing similar concepts.

Where a code number is used for retrieval, with increase of memory items it becomes difficult to store code numbers corresponding to contents of retrieval. In practice, a code number has to be selected by using a conversion table at all times.

In either case noted above, it is necessary to input file name, keyword and code number by keying operation when storing data and also when executing retrieval. This operation requires skill and time, and it is difficult to increase the operational efficiency.

Further, when registering image data, selection of adequate retrieval data is difficult like the above case. Further, operability is inferior.

SUMMARY OF THE INVENTION

An object of the invention is to provide an electronic data filing apparatus which is free from the drawbacks discussed above.

Another object of the invention is to provide an electronic data filing apparatus, which permits ready and speedy provision of retrieval data.

A further object of the invention is to provide an electronic data filing apparatus, which permits improvement of operability by registering a plurality of retrieval data in advance and selecting retrieval data to be provided among these registered retrieval data.

A still further object of the invention is to provide an electronic data filing apparatus, which permits production and provision of desired retrieval data.

The above and other objects of the invention will become more apparent from the following description with reference to the accompanying drawings and claims.

BRIEF DESCRIPTION OF THE DRAWINGS

FIG. 18 is a flow chart illustrating an operation of index addition in the same embodiment;

FIG. 19 is a flow chart illustrating an operation of retrieval of images in an opto-magnetic disk memory apparatus in the same embodiment;

FIG. 24 is a schematic view showing a directory management system when copying data on more than one data storing medium in the same embodiment;

FIGS. 30-1 to 30-7 are views showing examples of display on a display in the same embodiment;

DETAILED DESCRIPTION OF THE PREFERRED EMBODIMENTS

Figure 1:
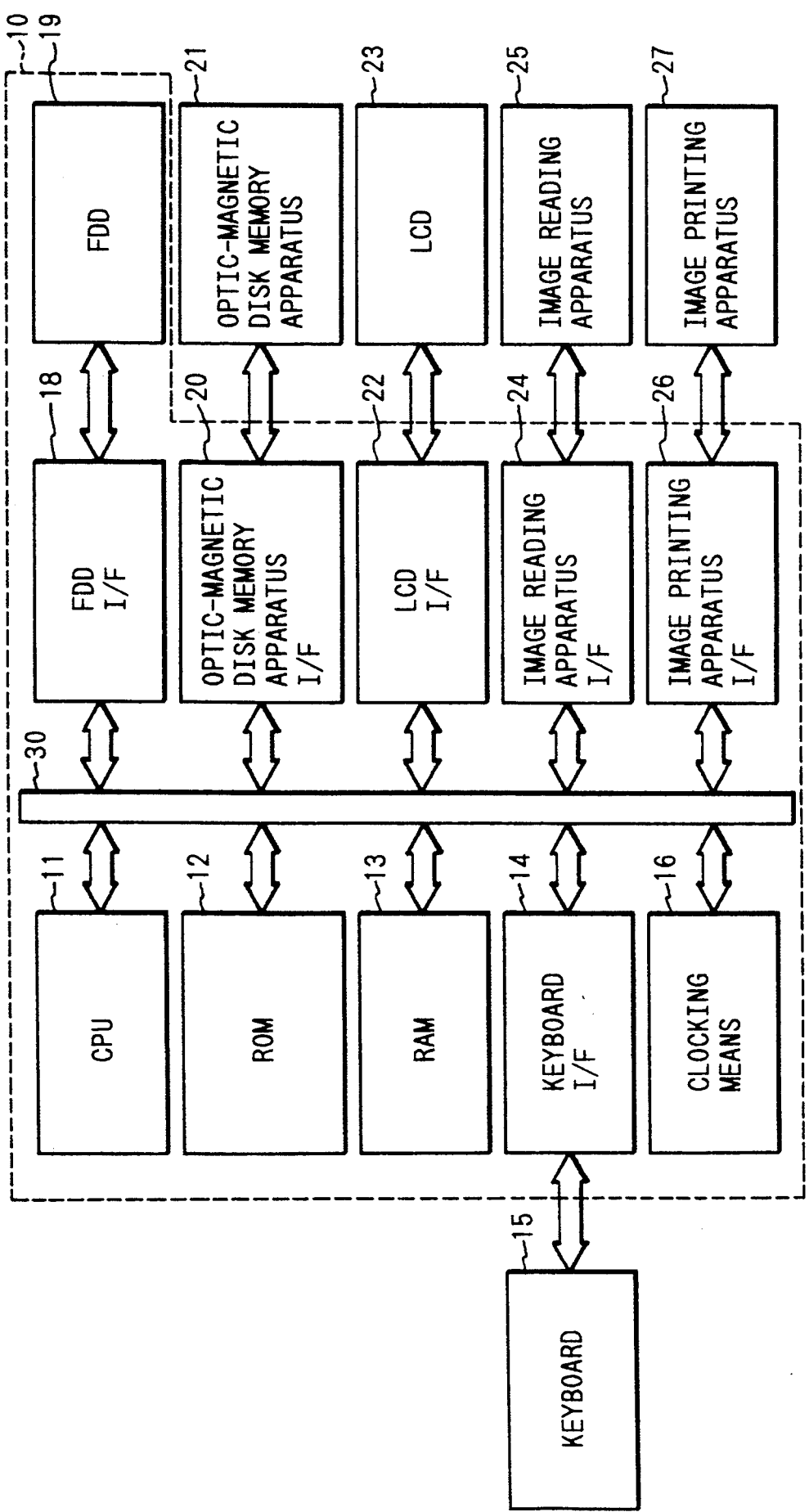
FIG. 1 is a block diagram showing the construction of a first embodiment of the data filing apparatus according to the invention.

FIG. 1 is a block diagram showing the construction of a first embodiment of the invention.

This data filing apparatus comprises central processor 10, keyboard 15, opto-magnetic disk memory apparatus 21, liquid crystal display 23, image reading apparatus 25 and image printing apparatus 27.

Central processor 10 includes CPU 11 as microprocessor, ROM 12 in which operation programs of CPU 11 are stored, and RAM 13 providing a word area of CPU 11 and a load area for various data and programs.

Central processor 10 further includes keyboard interface circuit 14 connecting keyboard 15 and system bus 30, floppy disk device interface circuit 19 connecting floppy disk device 19 and system bus 30, opto-magnetic disk memory apparatus interface circuit 20 connecting opto-magnetic disk apparatus 21 and system bus 30, liquid crystal display interface circuit 22 connecting liquid crystal display 23 and system bus 30, image reading apparatus interface circuit 24 connecting image reading apparatus 25 and system bus 30, and image printing apparatus interface circuit 26 connecting image printing apparatus 27 and system bus 26.

Clocking means 16 for counting data and time is further connected to system bus 30.

Figure 2:
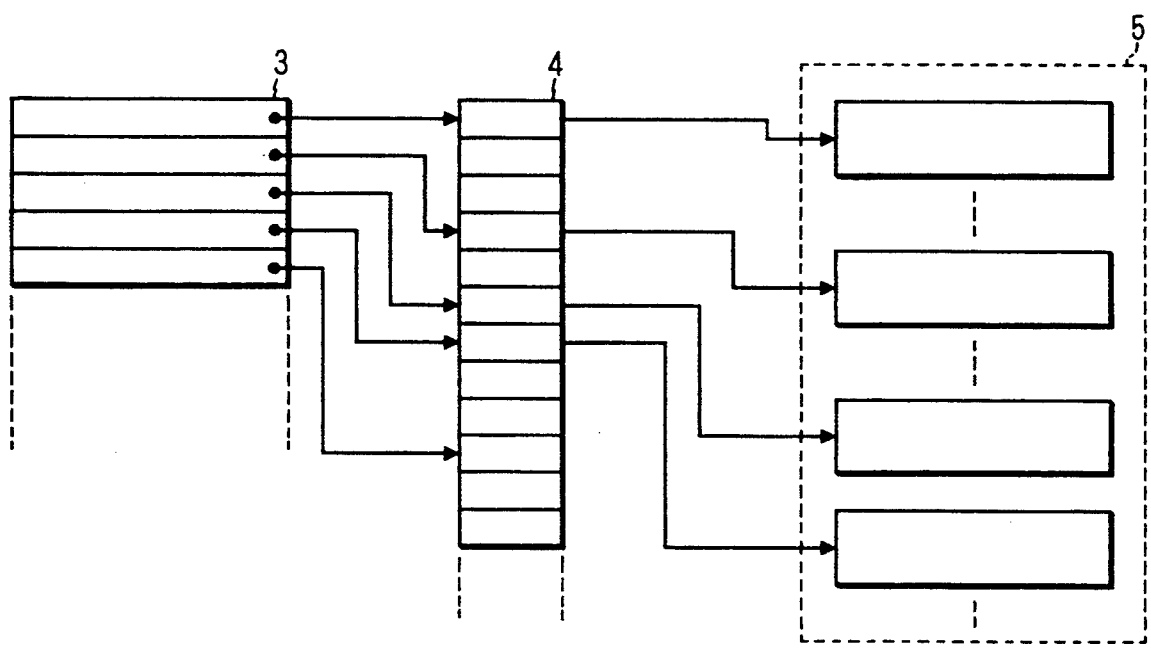
FIG. 2 is a schematic view showing memory area construction for data retrieval in the same embodiment.

FIG. 2 is a schematic view showing a memory area configuration in this embodiment of data filing apparatus.

Figure 3:
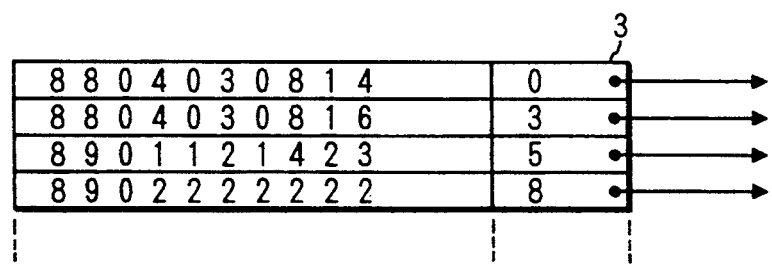
FIG. 3 is a schematic view showing specific contents of a directory in the same embodiment.

In this data filing apparatus, the retrieval of image data file group 5 is executed with directory 3 with retrieval data stored therein and FAT (file allocation table 4) for managing data recording addresses in recording medium. In this embodiment, when storing image data the corresponding date and time are input from clocking means 16, the date and time data being written in an empty area of directory 3, as shown in FIG. 3, and used as image identification data.

A summary of the operation of this data filing apparatus will now be described.

(1) Closure of power source

When the operator closes a power source switch (not shown), CPU 11 executes checking of the RAM and initializes internal parameters prescribed in ROM 12, executes initialization of the individual interface circuits and clears the liquid crystal display according to a program prescribed in ROM 12 to be ready for operation of the keyboard by the operator.

(2) Storing of image data

Subsequently, the operator instructs CPU 11 to read in image data for registration from the keyboard and sets original image on image reading apparatus 25.

CPU 11 detects, with a sensor provided in an original setting section of the image reading apparatus and through image reading apparatus interface circuit 24, that the original is set. In consequence, it provides a start signal to image reading apparatus 25 through image reading apparatus interface circuit 24 for reading image data into RAM 13. Further, for giving confirmation of exposing to the operator, CPU 11 displays image data in RAM 13 on liquid crystal display 23 through liquid crystal display interface circuit 23.

Then, CPU 11 receives image reading date and time data from clocking means 16 and stores as image discrimination code in an empty area of directory 3 in opto-magnetic disk memory apparatus 21 through opto-magnetic disk memory apparatus interface circuit 20. Further, it stores image data in an empty area of data file in opto-magnetic disk memory apparatus 21.

The relation between image identification codes in directory 3 and image data is managed by providing directory 3 with pointers representing FAT numbers corresponding to image data memory areas.

(3) Copying operation

Figure 4:
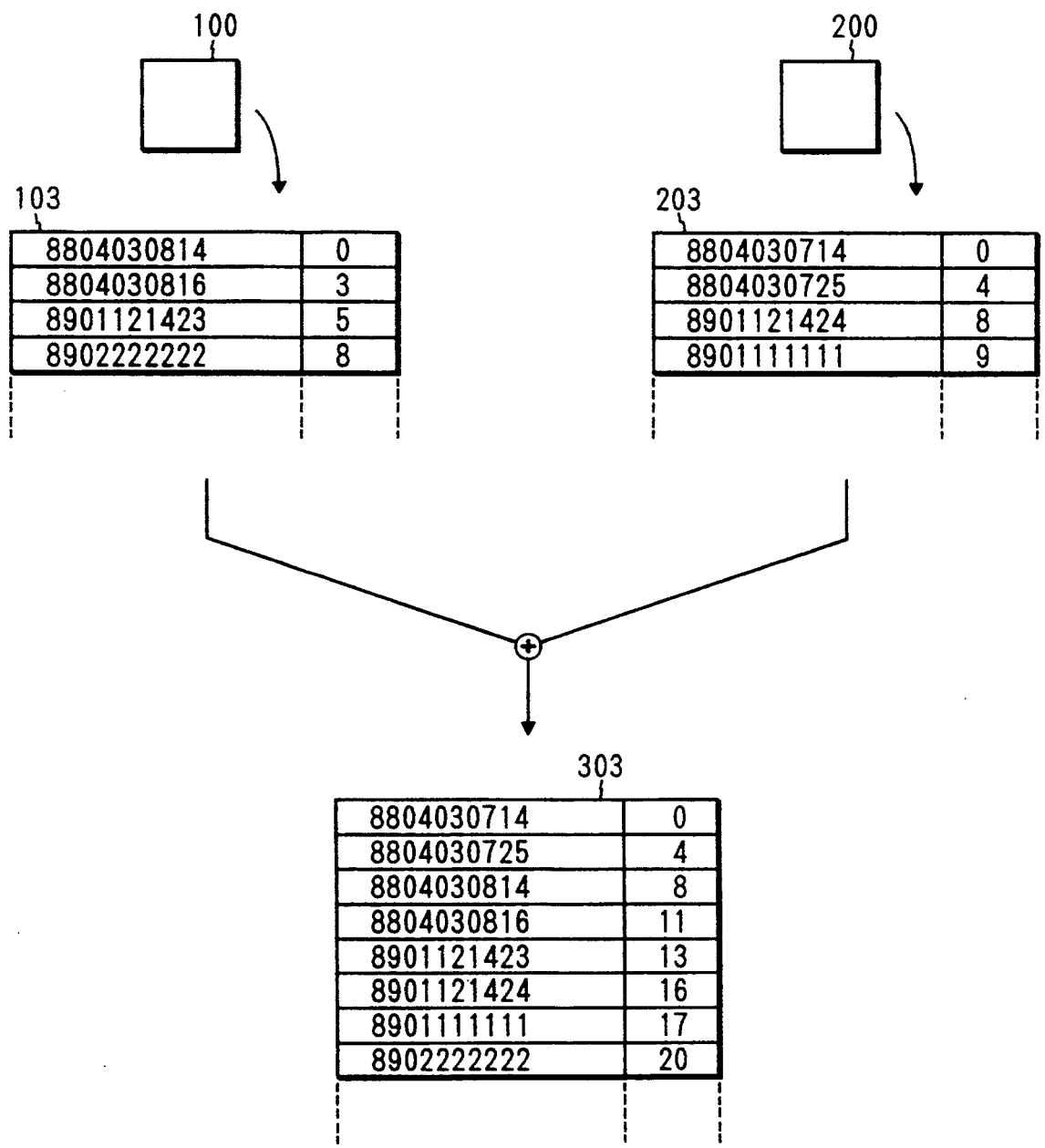
FIG. 4 is a schematic view showing a directory management system when copying data on more than one data storing media in the same embodiment.

FIG. 4 is a schematic view showing a system for managing directory 3 when copying data of data storing media.

Referring to FIG. 4, directories 103 and 203 are for opto-magnetic disk data storing media 100 and 200 carrying stored data.

When copying the data on these two media on a common opto-magnetic disk medium, image identification data after copying and synthesis are synthesized and managed on directory 303 for a directory produced for a plurality of data storing media is provided with own image identification codes.

In this embodiment, opto-magnetic disks are used as image storing medium. However, this is by no means limitative, and it is possible to use magnetic disks, optical disks, IC cards, laser cards, etc. as well. This also applies to the following embodiments as well.

Figure 5:
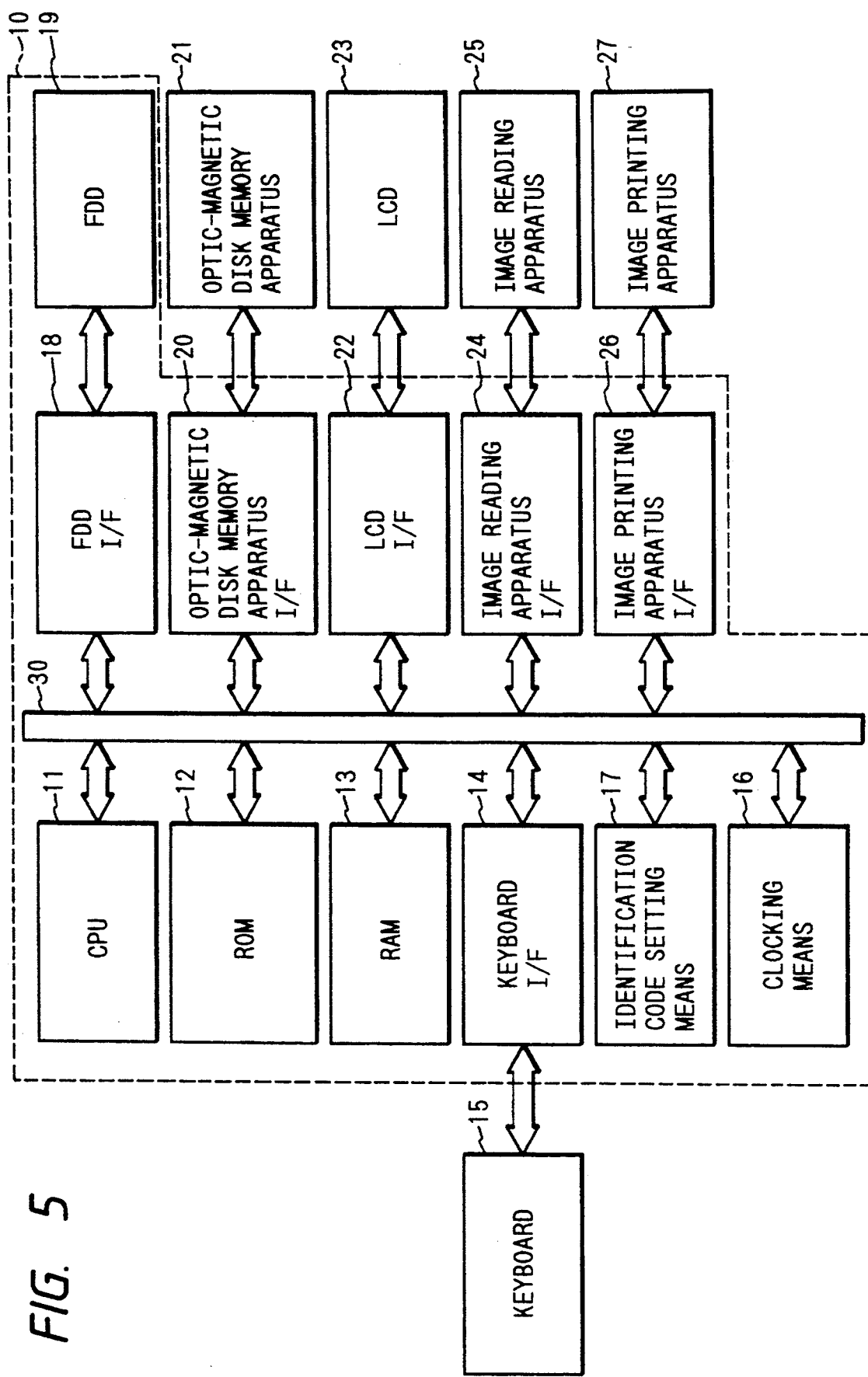
FIG. 5 is a block diagram showing the construction of a second embodiment of the data filing apparatus according to the invention.

FIG. 5 is a block diagram showing the construction of a second embodiment of the invention.

In this embodiment of image filing apparatus, identification code setting means 17 is provided in addition to identification codes in the clocking means of the preceding embodiment. Identification code setting means 17 consists of dip switches or battery backed-up RAM. Given code data is set as apparatus identification code by the operator by switch operation or keying operation prior to the image reading operation.

Figure 6:
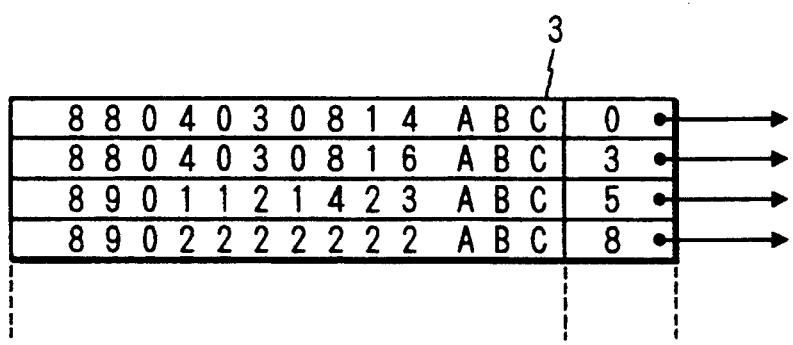
FIG. 6 is a schematic view showing specific contents of a directory in the same embodiment.

In this embodiment, like the above embodiment, date and time data at the time of image reading from clocking means 16 is stored together with apparatus identification code of identification code setting means 17 in an empty area of directory 3, as shown in FIG. 6.

Since in this embodiment image identification code contains apparatus identification code, even when images read out at identical times with different image filling apparatus are copied on a common image filing apparatus or image storing medium, both image data can be stored such that they are capable of independent retrieval from each other. In this case, directory 3 is managed in a manner as shown in FIG. 7.

Figure 7:
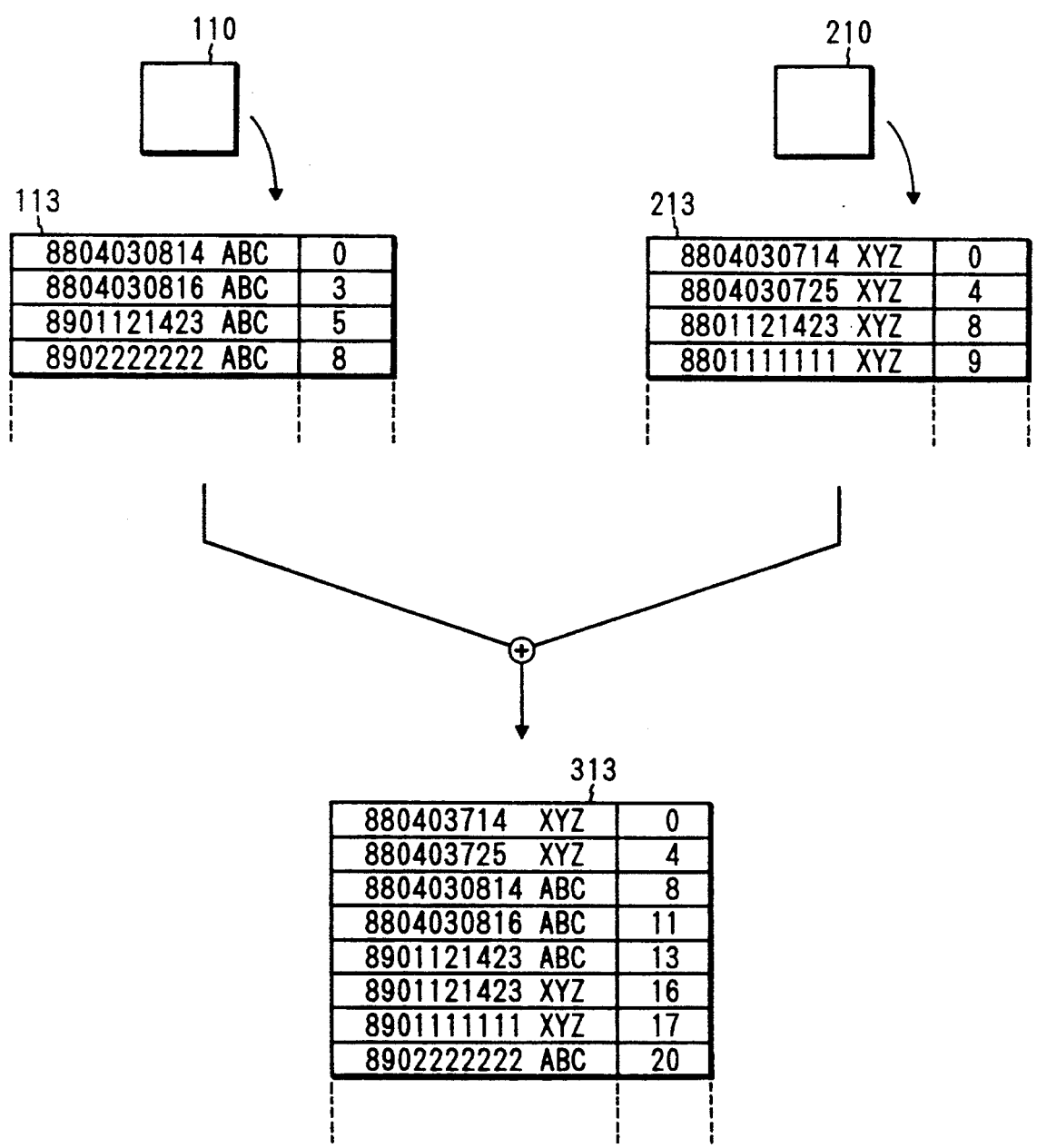
FIG. 7 is a schematic view showing a directory management system when copying data on more than one data storing media in the same embodiment.

Referring to FIG. 7, directories 113 and 213 are for opto-magnetic disk data storing media 110 and 210 carrying stored data.

When copying the data on these two media on a common opto-magnetic disk medium, image identification data after copying and synthesis are synthesized and managed on directory 313 for a directory produced for a plurality of data storing media is provided with its own image identification codes.

The other construction and operation are substantially the same as those of the previous embodiment.

Figure 8:
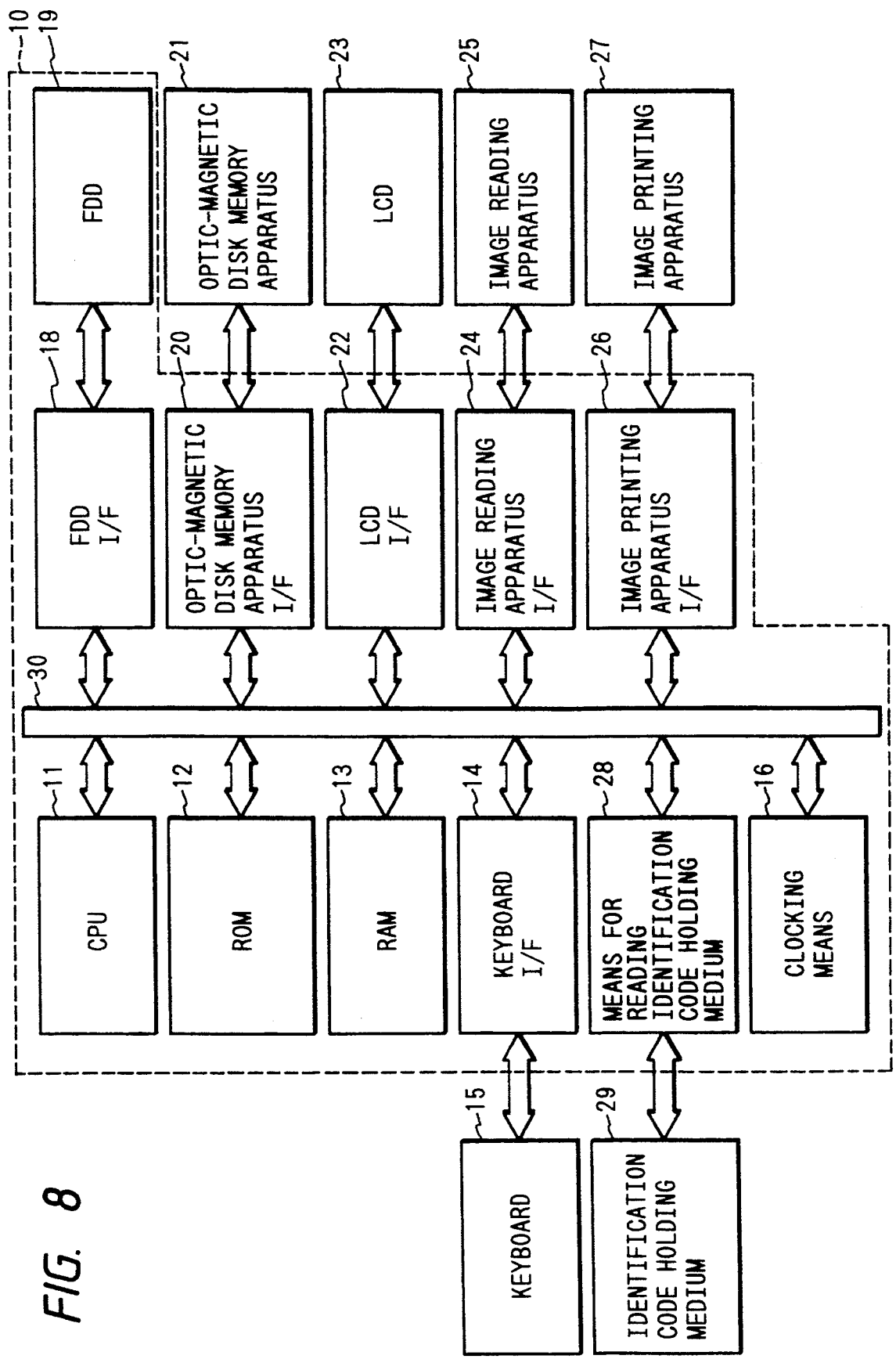
FIG. 8 is a block diagram showing the construction of a third embodiment of the data filing apparatus according to the invention.

FIG. 8 is a block diagram showing the construction of a third embodiment of the invention.

Figure 9:
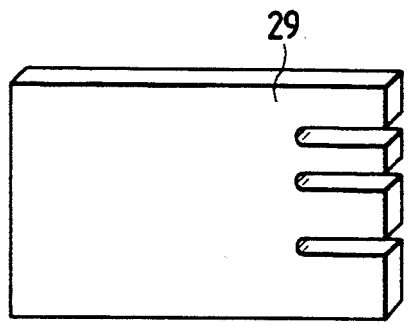
FIG. 9 is a plan view showing an indentification code holding medium used in the same embodiment.

In this embodiment of image filing apparatus, identification code holding medium reading means 28 for reading identification codes from identification code holding medium 29 is provided in lieu of identification code setting means 17 in the preceding second embodiment. As identification code holding medium 29 may be used a card provided with slits representing an identification code, as shown in FIG. 9.

Figure 10:
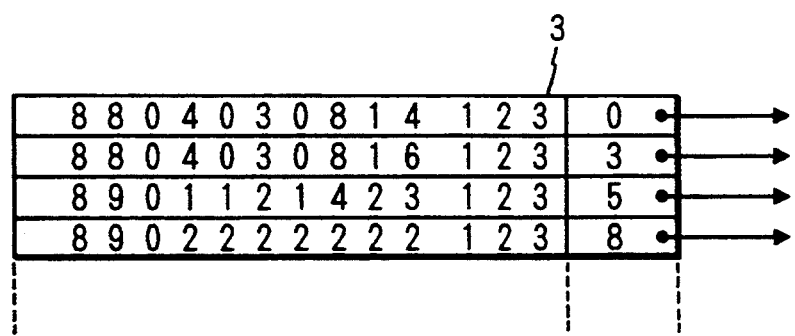
FIG. 10 is a schematic view showing specific contents of a directory in the same embodiment.

In this embodiment, like the preceding embodiment, data and time data at the time of image reading from clocking means 16 is stored together with apparatus identification code of identification code holding medium reading means 28 in an empty area of directory 4, as shown in FIG. 10.

Since in this embodiment image identification code contains an identification code peculiar to identification code holding medium 29, even when images read out at identical times with different image filing apparatus are copied on a common image filing apparatus or image storing medium, both image data can be stored such that they are capable of independent retrieval from each other. In this case, directory 3 is managed in a manner as shown in FIG. 11.

Figure 11:
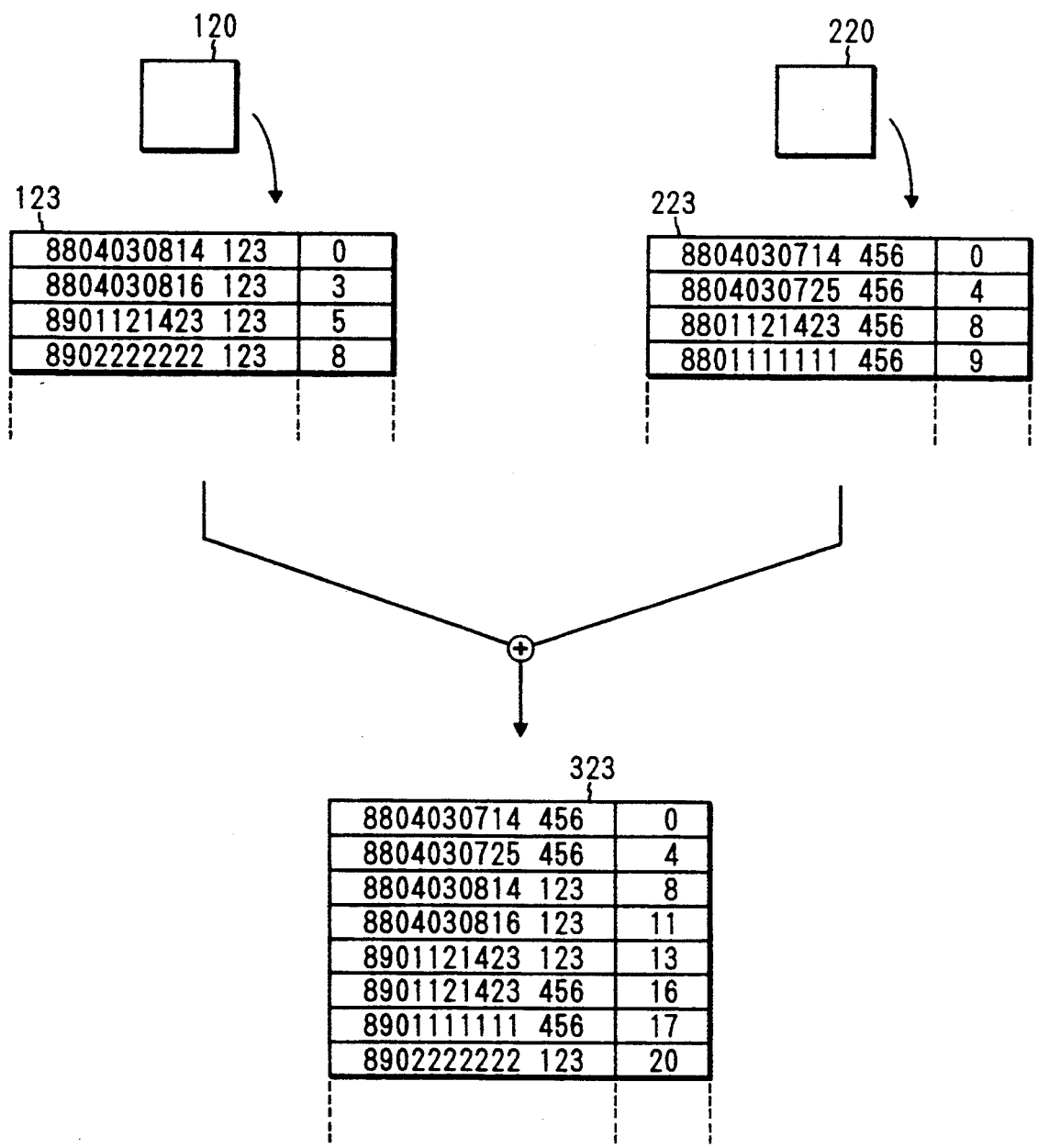
FIG. 11 is a schematic view showing a directory management system when copying data on more than one data storing medium in the same embodiment.

Referring to FIG. 11, directories 123 and 223 are for opto-magnetic disk data storing media 120 and 220 carrying stored data.

When copying the data on these two media on a common opto-magnetic disk medium, image identification data after copying and synthesis are synthesized and managed on directory 323 for a directory produced for a plurality of data storing media is provided with own image identification codes.

The other construction and operation are substantially the same as those of the previous embodiment.

Figure 12:
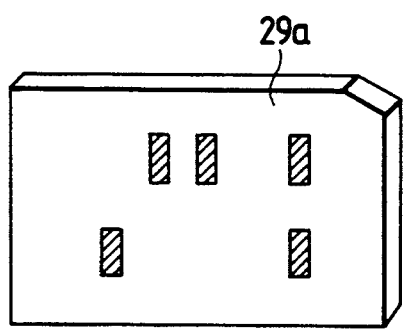
FIG. 12 is a plan view showing a different example of identification code holding medium.
Figure 13:
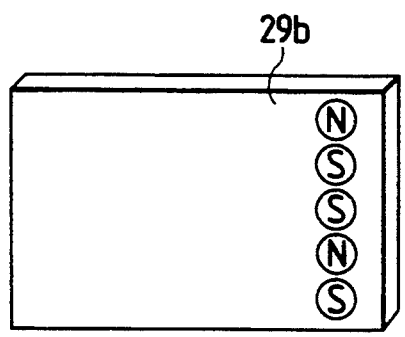
FIG. 13 is a plan view showing a further example of identification code holding medium.

The identification code holding medium may be of various forms. FIG. 12 shows a different example of the medium, which is card 29a provided with a mark representing an identification code. FIG. 13 shows a further example of the medium, which is a card or IC card with a magnetic zone representing an identification code.

Figure 14:
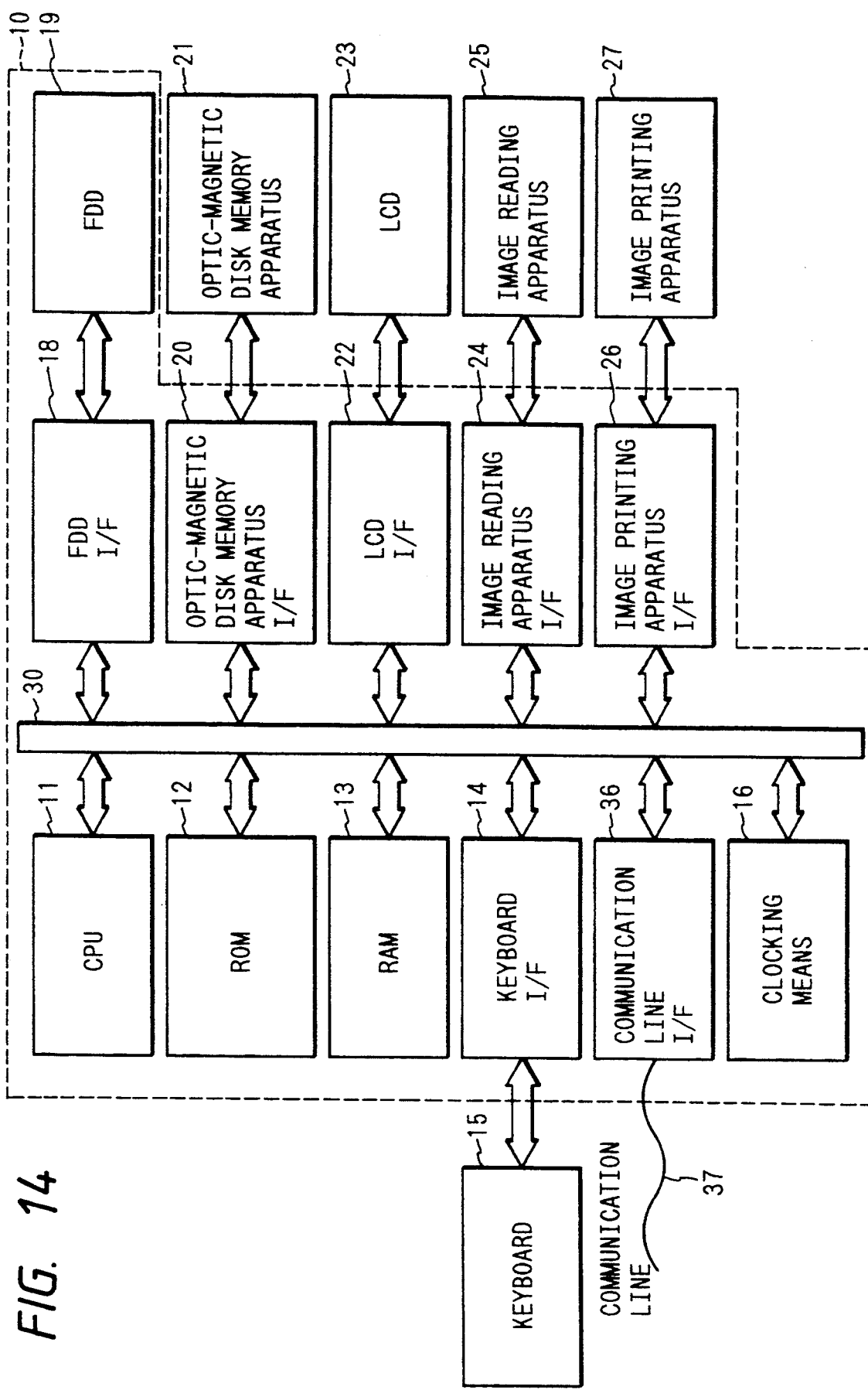
FIG. 14 is a block diagram showing the construction of a fourth embodiment of the data filing apparatus according to the invention.

FIG. 14 is a block diagram showing the construction of a fourth embodiment of the invention.

In this data filing apparatus, communication line interface 36 connecting communication line 37 and system bus 30 is provided for storing data received from the outside.

In this embodiment, received image read out by image reading means on transmitter side or retrieval image read out by image reading apparatus 25 of this apparatus is contracted to produce index image data which is stored. In addition, relative data representing a relation between index image data and data for retrieval is also produced and stored. By selecting index image data, data retrieval is executed according to relative data.

Figure 15:
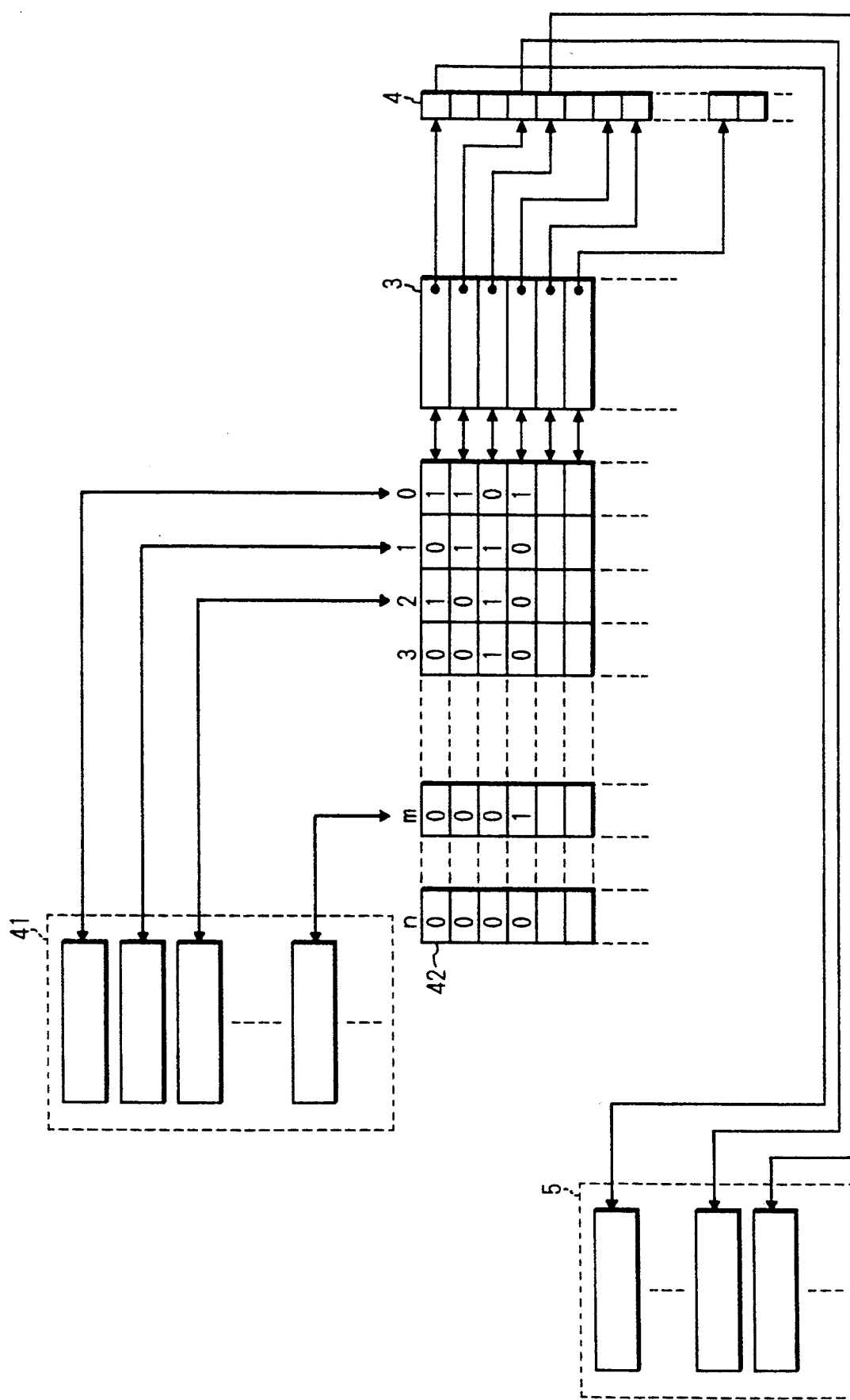
FIG. 15 is a schematic view showing memory area construction for data retrieval in the same embodiment.
Figure 16:
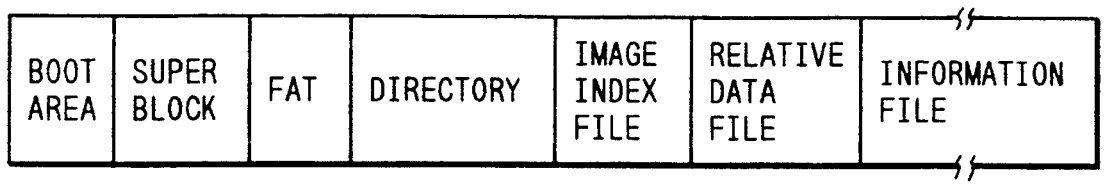
FIG. 16 is a schematic view showing data arrangement on disk in the same embodiment.

In this embodiment, as shown in FIG. 15, index data file 41 storing index image data 1-0 to 1-m and relative data file 42 for producing and storing relative data noted above are provided as a stage preceding directory 3. On actual disk, data sequence as shown in FIG. 16 is stored.

Figure 17:
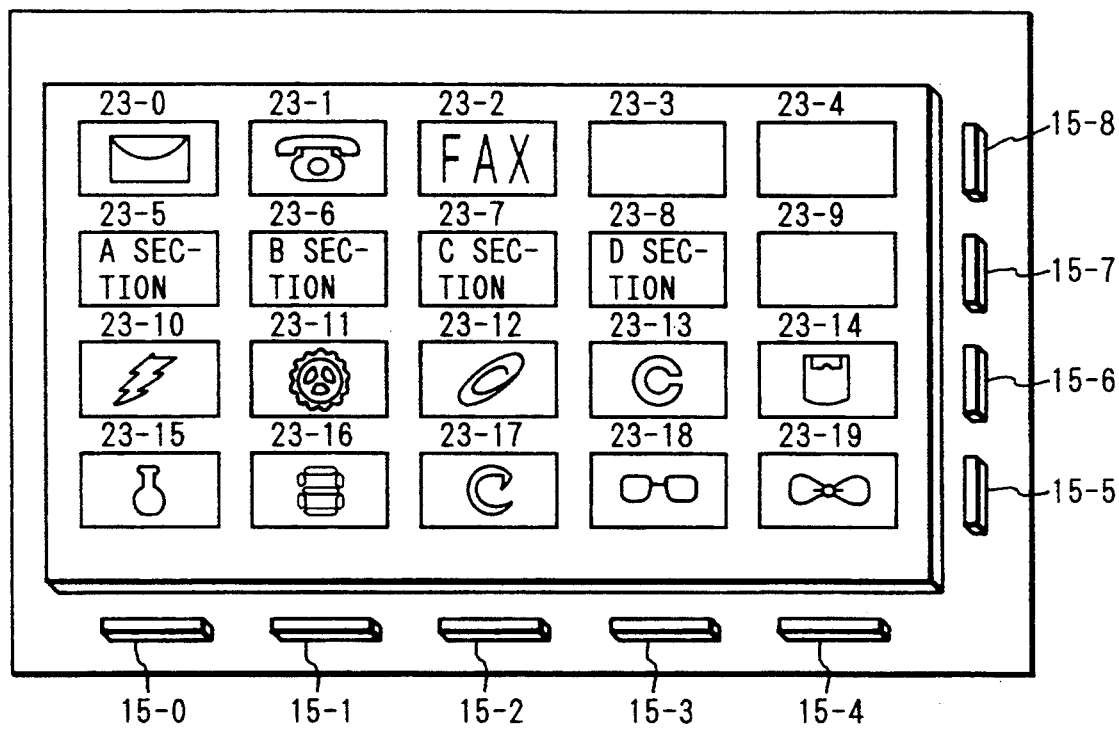
FIG. 17 is a front view showing a key arrangement of a keyboard in the same embodiment.

FIG. 17 illustrates the key array on keyboard 15.

In this embodiment, keys 15-0 to 15-8 are provided around liquid crystal display 23 for displaying index images 23-0 to 23-19 thereon. Individual index images 23-0 to 23-19 can be designated one by one by combinations of keys 15-0 to 15-4 arranged horizontally and keys 15-5 to 15-8 arranged vertically.

Now, a summary of the operation of this embodiment will be described.

(1) Registration of index image

After closure of the power source, the operator designates a retrieval index image registration mode from keyboard 15 and designates the position of display area for index image registration thereon with a combination of keys 15-0 to 15-4 and 15-5 to 15-8. Then an original carrying the index images is set on image reading apparatus 25.

CPU 11 detects through image reading apparatus interface circuit 24 that the original is set. Consequently, it provides a start signal to image reading apparatus 25 through image reading apparatus interface circuit 24 for reading of index image production image data into an image reading area of RAM 13. When storing received image data, the received image data is stored in the image reading area of RAM 13 before the registration.

The index image production image data which is read into the image reading area of RAM 13 is ordinary size image data. On the other hand, it is necessary to display a plurality of (practically 8 to 30) index images at a time on liquid crystal display 23. The number of pixels of the read-out image data and those of liquid crystal display 23 do not coincide, To overcome this three methods are conceivable;

(1) the original image is contracted for reading by limiting area, (2) the index image data is made ordinary size image data and contracted when displayed, and (3) ordinary size image data is contracted as index image.

In the method in (1), a small size original has to be produced, which is difficult. In addition, alignment at the time of reading is difficult. In the method in (2) the index image can be read quickly. However, its data amount is large, thus increasing the occupied area of the data filing apparatus. Besides, time for contracting process is necessary when displaying the index image.

Accordingly, in this embodiment the method in (3) is adopted to produce index image.

More specifically, according to a program stored in ROM 12 CPU 11 selects bits corresponding to a given contraction factor among the bits corresponding to the pixels of image data on RAM 13 and copies the image in a contracted scale in the index image area of RAM 13. This bit reduction is to produce index image by selecting one pixel for every 5 pixels in case when the contraction factor is 1/5. This is done in both vertical and horizontal directions of the image.

In the above way, index image is produced in the index image area of RAM 13.

Subsequently, CPU 11 displays the index image data in RAM 13 on a designated area of liquid crystal display 23, while also storing this index image data in an index image file area of opto-magnetic disk memory apparatus 21 through opto-magnetic disk memory apparatus interface circuit 20.

In this way, desired index images are registered one after another.

(2) Storing of data to be registered

Subsequently, the operator instructs CPU 11 to read in image data to be registered from the keyboard and sets original image on image reading apparatus 25.

CPU 11 detects, through image reading apparatus interface circuit 24, that the original is set. In consequence, it starts image reading apparatus 25 through image reading apparatus interface circuit 24 for reading image data into RAM 13. In addition, for confirmation of exposing, CPU 11 displays image data in RAM 13 on liquid crystal display 23. Further, CPU 11 stores image data in an empty data file area of opto-magnetic disk memory apparatus 21 through opto-magnetic disk memory apparatus interface circuit 20.

(3) Addition of index

Subsequently, the operator adds index to image data stored in opto-magnetic disk memory apparatus 21 in the following way.

FIG. 18 is a flow chart illustrating operation when adding index.

When the operator designates addition of index with keyboard 15 (step S1), CPU 11 loads subject image with index to be added thereto in RAM 13 from the data file area of opto-magnetic disk memory apparatus 21 and displays it on liquid crystal display 23 (step S2).

Then, the operator selects index image corresponding to the contents displayed on liquid crystal display 23 in terms of a combination of keys 15-0 to 15-4 and 15-5 to 15-8 (step S3).

CPU 11 then sets a designated bit position in bit sequence corresponding to subject image of index addition in relative data area to "1" (step S4).

The above sequence of operations is repeated (step S5), whereby relative data consisting of a combination of "0"s and "1"s is produced in the bit sequence corresponding to the called image data among bit sequences 0 to n in the relative data file.

When relative data corresponding to image data is produced, the routine goes back to step S2 for index addition to next image data (step S6). The above sequence of operations is repeatedly executed for all image data to complete the index addition.

The relative data is managed by CPU 11 such that data in RAM 13 and data in opto-magnetic disk memory apparatus 21 or floppy disk memory apparatus 19 are of the same contents.

(4) Retrieval procedure

FIG. 19 is a flow chart illustrating operation of retrieval of data in opto-magnetic disk memory apparatus 21.

In the retrieval of data that has been subjected to index addition as described above, the operator first designates a retrieval mode from keyboard 15 (step S11) and then designates index image related to image for retrieval among a plurality of index images displayed on liquid crystal display 23 in terms of a combination of keys 15-0 to 15-4 and 15-5 to 15-8 (step S12). It is possible to designate a plurality of index images at a time. Further, when the opto-magnetic disk is set, index image is transferred therefrom to RAM 13.

Then, CPU 11 searches the relative data file for bit pattern of bit position specified by designated index data for each bit sequence (step S13). When a pertaining bit pattern is found, image data corresponding to that bit sequence satisfies a retrieval condition (step S14). Thus, CPU 11 reads out corresponding image data from opto-magnetic disk memory apparatus 21 and loads it in RAM 13 (step S15). If there is no pertaining bit pattern, after searching all the bit sequences, CPU 11 displays a message indicative of absence of pertaining image, thus bringing an end to the process (step S16).

If there are a plurality of image data satisfying the retrieval condition, there is no problem. In this case, sequential image display may be executed, or alternatively the number of list of pertaining images may be displayed.

As has been shown, with this embodiment at the time of registration of index image an original of index image may be produced with a large drawing or character which can be easily drawn by the operator, and index image may be read without paying particular conditions to the reading position, thus permitting operability improvement.

Further, while in this embodiment image data for retrieval is stored prior to the storing of retrieval data, converse storing is also possible.

Further, while in this embodiment stored data is displayed for selecting index image corresponding to the displayed data, it is also possible to let index image to be selected at the time of storing.

Further, while in this embodiment image contraction is executed at the time of registration of index image, this is not necessary; for instance index image may be formed by trimming part of original image.

Further, while this embodiment concerns image data as retrieval data, this is by no means limitative, and the invention covers various kinds of data and registration routes thereof such as code data from communication lines, compressed image data and code data on floppy disks.

Further, the data arrangement on the data storing medium in this embodiment is only a theoretical model for the sake of explanation and is by no means limitative. In addition, there is no need of storing image data, relative data and retrieval data on the same data storing medium, and these data may be stored distributedly on a plurality of media as well.

Further, while in this embodiment switches for designating rows and columns are provided for permitting selection of index image, it is also possible to use a touch panel mounted in liquid crystal display, or designation may be effected on the basis of a number input from numeric keys.

Figure 20:
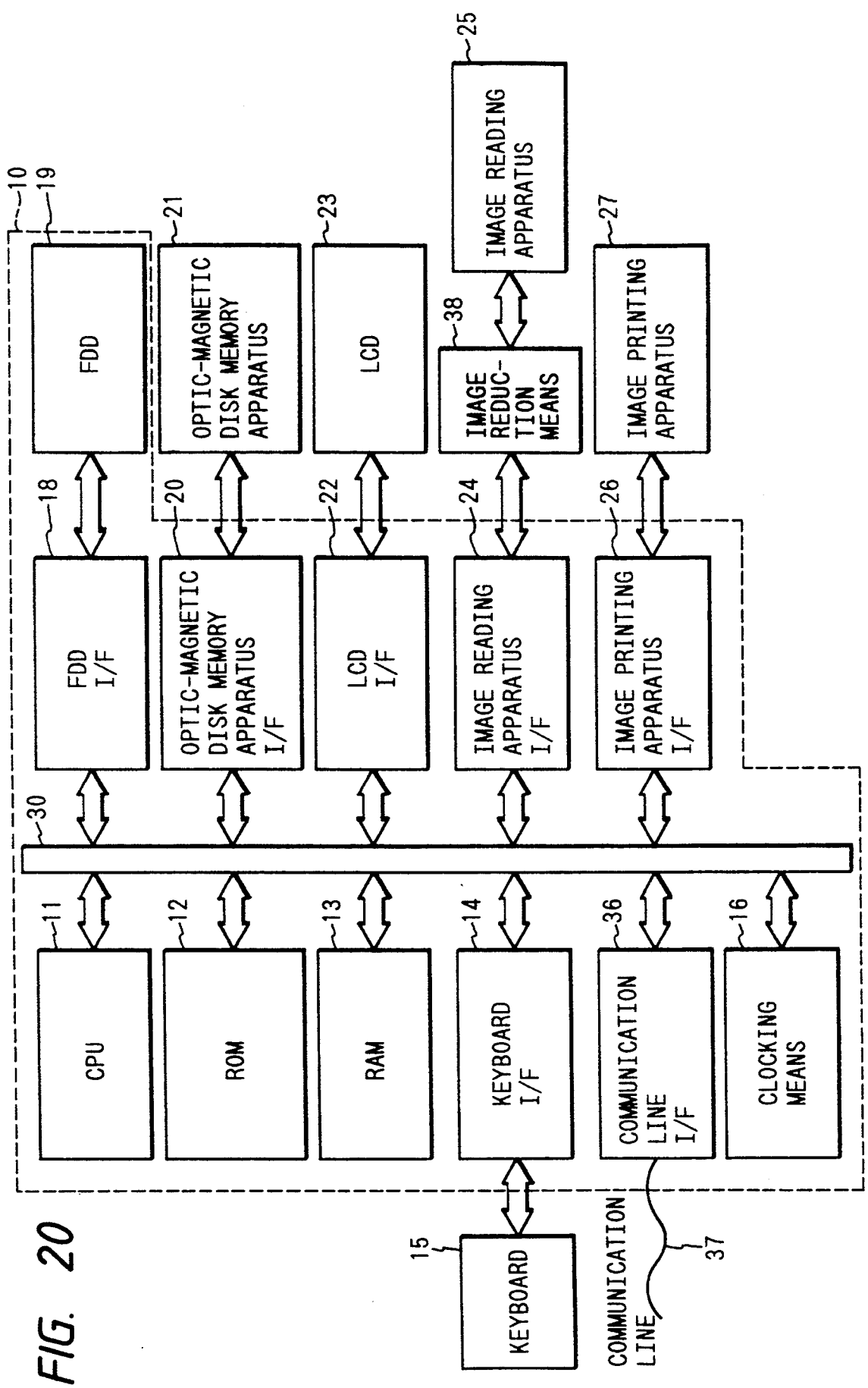
FIG. 20 is a block diagram showing a fifth embodiment of the data filing apparatus according to the invention.

FIG. 20 is a block diagram showing a fifth embodiment of the invention.

In this embodiment, image contraction means 38 is provided between image reading apparatus 25 and image reading apparatus interface circuit 24. Image contraction means 38 effects image contraction when index image is read out, and it includes a resister, a counter, and an AND gate and an OR gate.

Figure 21:
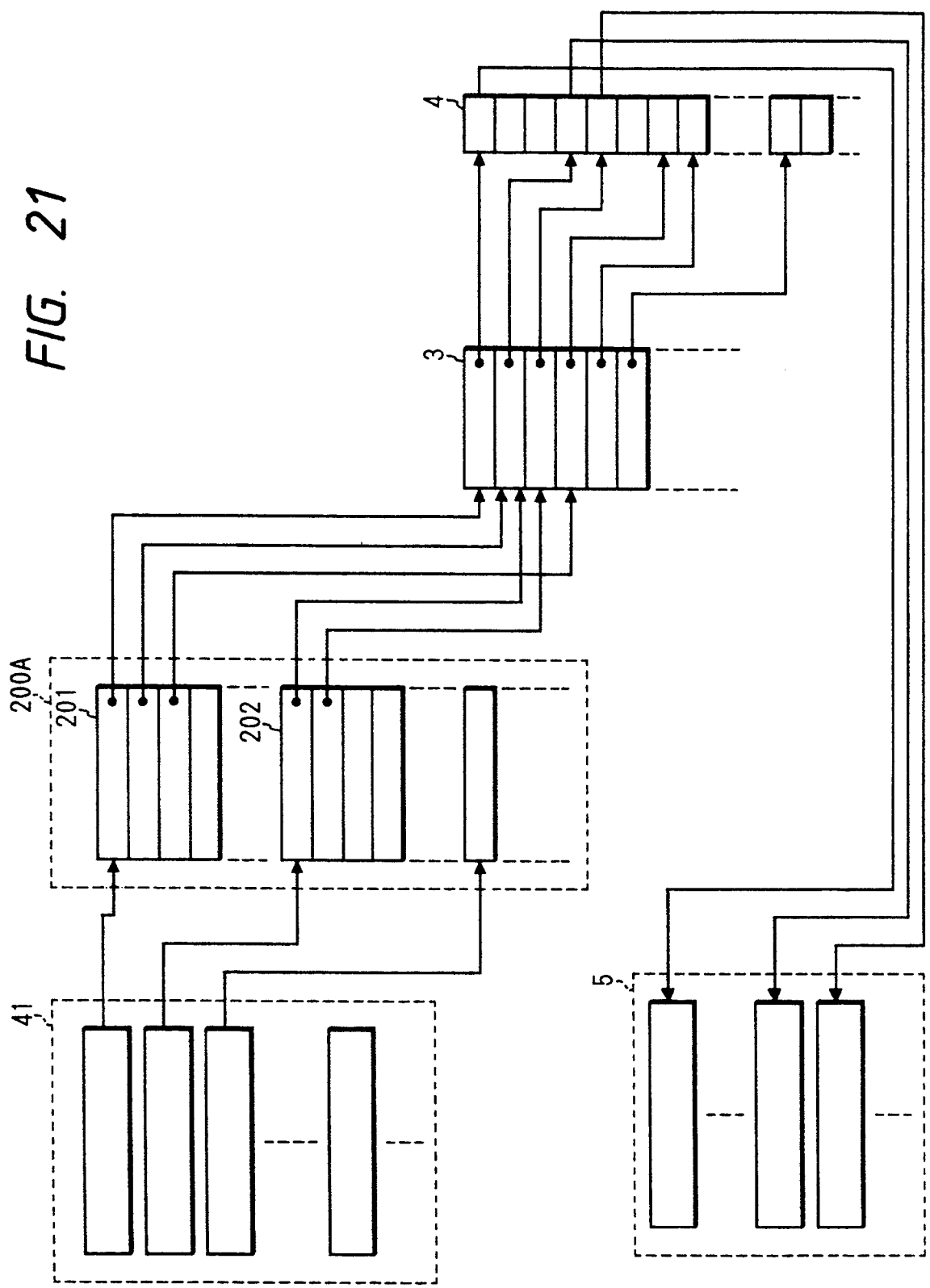
FIG. 21 is a schematic view showing memory area construction for data retrieval in the same embodiment.

Further, relative data file 200A of this embodiment, as shown in FIG. 21, has pointer areas 201, 202, ... corresponding to the respective index images.

In the operation of index image registration in this embodiment, when CPU 11 detects that original is set in image reading apparatus 25 by the operator, it renders image contraction means 38 operative and then starts image reading apparatus 25 to supply image data to image contraction means 38. Image contraction means 38 contracts input image data with a predetermined contraction factor to produce index image data, which is supplied to image reading apparatus interface circuit 24. The image contraction is effected by removing one pixel for every five pixels in one of every five main scanning lines in case when the contraction factor is 1/5.

Subsequently, index image is displayed and stored in the manner as described before in connection with the fourth embodiment.

Further, retrieval data is stored in the manner as in the fourth embodiment. In the index addition operation of this embodiment, when index image of retrieval image is designated by a combination of keys 15-0 to 15-4 and 15-5 to 15-8, CPU 11 sets a pointer of the image to the directory in a pointer area of relative data file 200A corresponding to the designated index image.

The retrieval is carried out in the manner as in the fourth embodiment.

In this embodiment, any data which absolutely corresponds to the file name of the like of data of selected index image.

Figure 22:
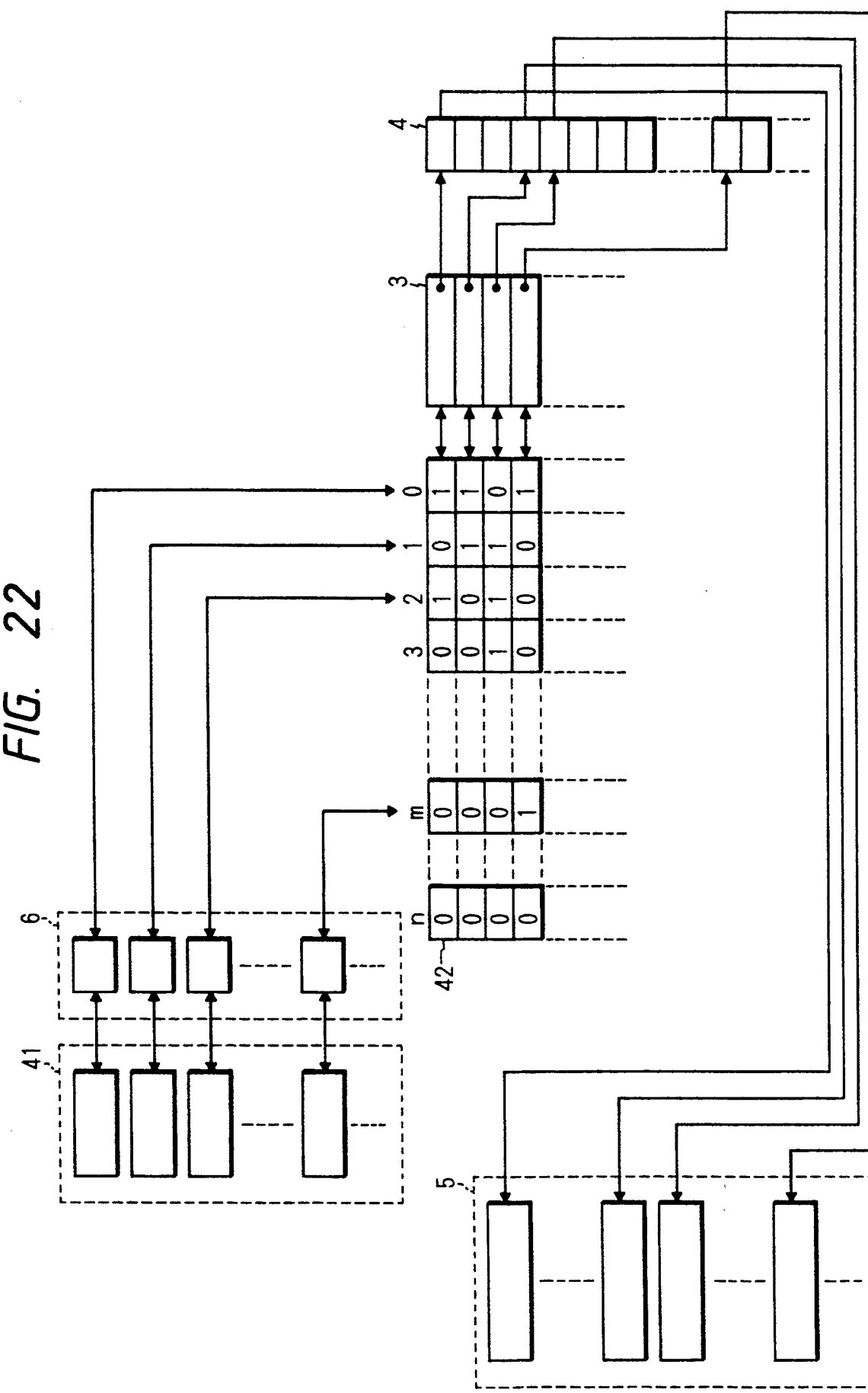
FIG. 22 is a schematic view showing memory area construction for data retrieval in a sixth embodiment of the data filing apparatus according to the invention.

FIG. 22 is a schematic view showing the memory area construction for data retrieval in a sixth embodiment of the invention.

In this data filing apparatus, index data identification data area 6 is provided between index image data file 41 and relative data file 42 shown in FIG. 15. For the rest, this data filing apparatus is the same as that shown in FIG. 1. Meanwhile, this apparatus is provided with the same keyboard as shown in FIG. 17.

When registering index image with this data filing apparatus, index image is stored in index image file area of opto-magnetic disk memory apparatus 21 in the same procedure as in the fourth embodiment described before in connection with FIG. 15.

When reading this index data, CPU 11 receives data and time data of present data and time from clocking means 16, and it stores this data as index image identification data in an address of index image identification data area 6 of opto-magnetic disk memory apparatus 21 that corresponds to the index image stored this time.

Figure 23:
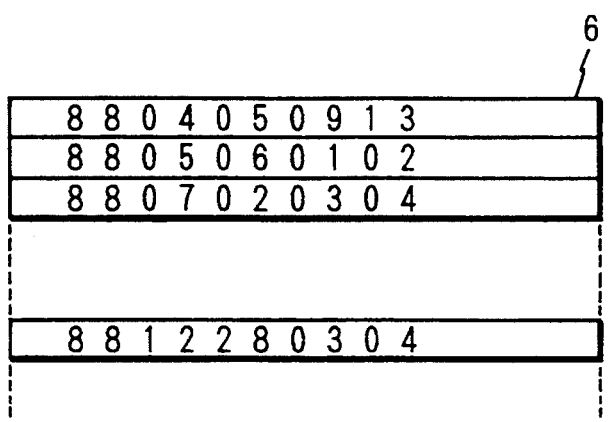
FIG. 23 is a schematic view showing specific contents in an index image identification data area in the same embodiment.

FIG. 23 is a schematic view showing a specific example of index image identification data area 6.

The storing of retrieval data, addition of index and retrieval are performed in the same manner as in the fourth embodiment.

In the copying of data on more than one data storing medium, index data is managed as follows.

Referring to FIG. 24, directories 107 and 207 are for opto-magnetic disk data storing media 100a and 200a carrying stored data.

When copying the data on these two media on a common opto-magnetic disk medium, image identification data after copying and synthesis are synthesized and managed on directory 307 for a directory produced for a plurality of data storing media is provided with own image identification codes.

Figure 25:
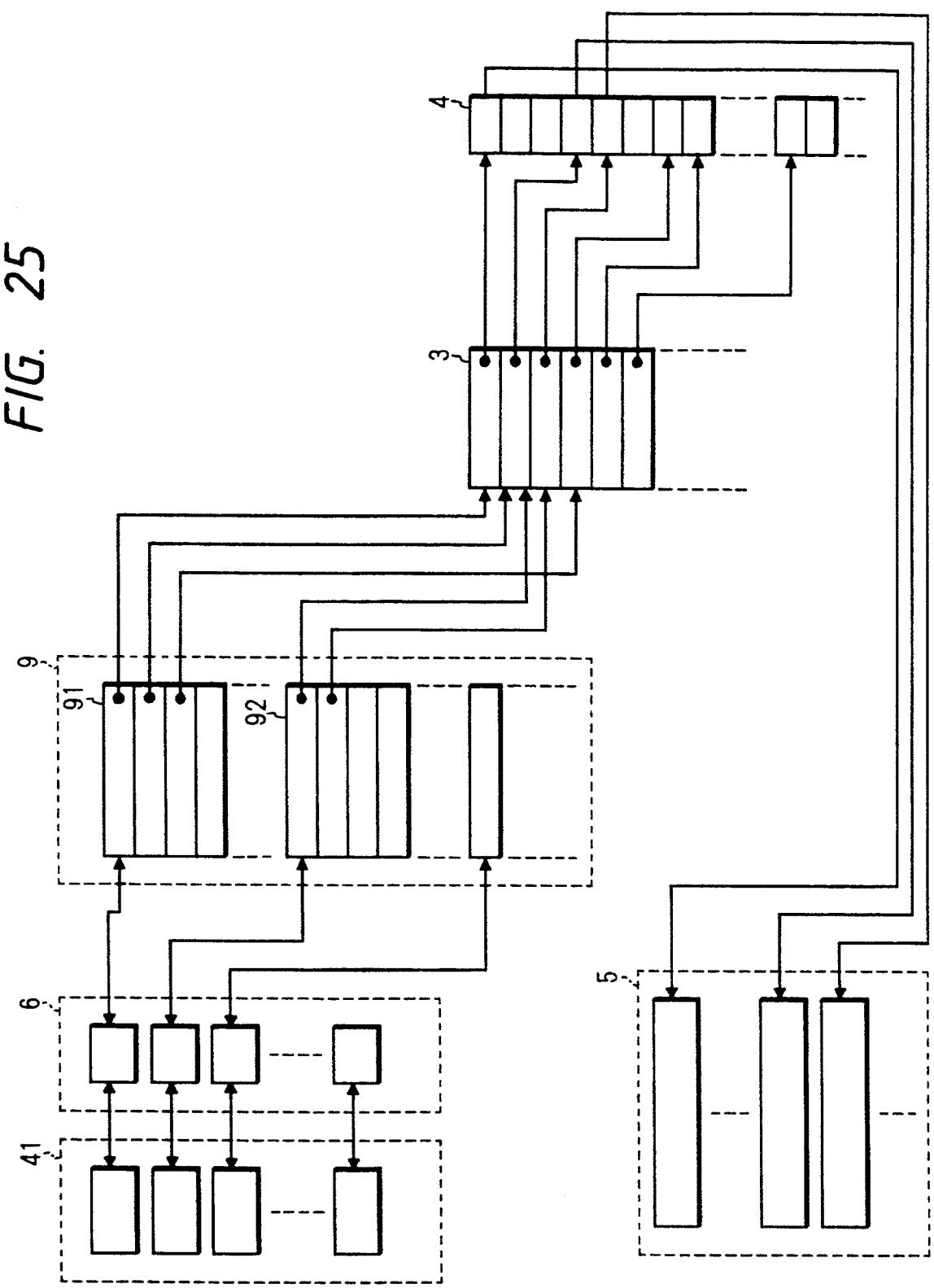
FIG. 25 is a schematic view showing memory area construction for data retrieval in a seventh embodiment of the data filing apparatus according to the invention.

FIG. 25 is a schematic view showing the memory area construction for data retrieval in a seventh embodiment of the invention.

In this data filing apparatus, relative data file 9 having pointer areas 91, 92, . . . corresponding to the respective index data indentification data is provided in lieu of relative data file 41 shown in FIG. 22. For the rest, this data filing apparatus is the same as that shown in FIG. 5. Meanwhile, again this data filing apparatus is provided with the same keyboard as shown in FIG. 17.

In this data filing apparatus, registration of index data, storing of retrieval data and retrieval are performed in the same manner as in the sixth embodiment.

Further, in the index addition operation of this embodiment, when index image of retrieval image is designated by keys 15-0 to 15-8, CPU 11 sets a pointer of the image to the directory in a pointer area of relative data file 9 that corresponds to the designated index image.

Figure 26:
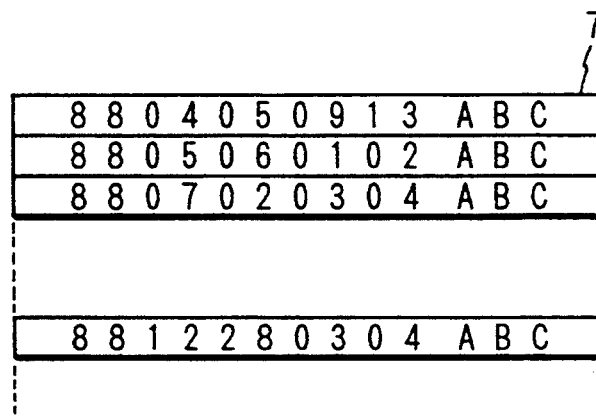
FIG. 26 is a schematic view showing specific contents of an index image identification data area in the same embodiment.

FIG. 26 is a schematic view showing a specific example of index image identification data area 6.

In the copying of data on more than one data storing medium, index data is managed as follows.

Figure 27:
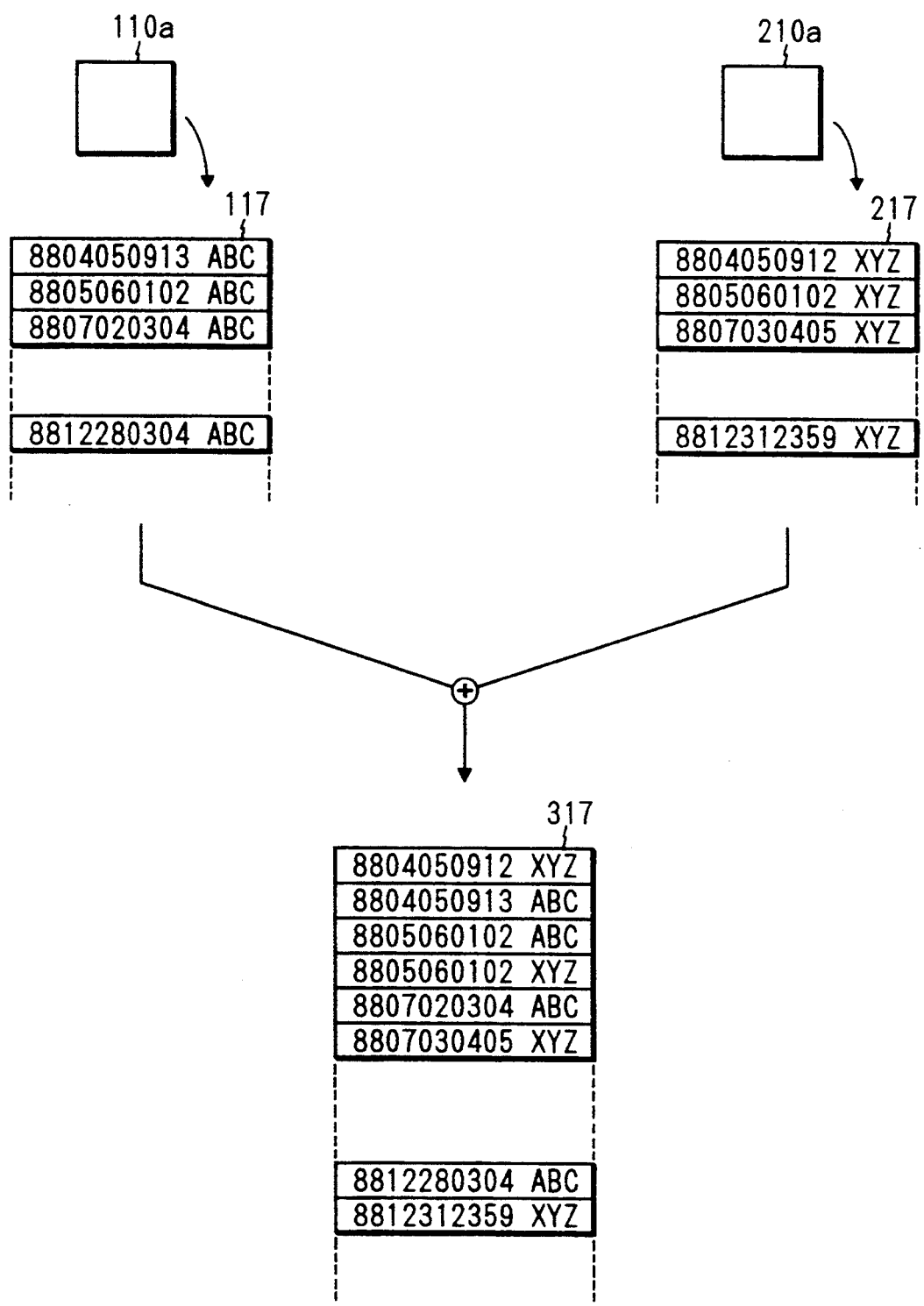
FIG. 27 is a schematic view showing a directory management system when copying data on more than one data storing medium in the same embodiment.

Referring to FIG. 27, directories 117 and 217 are for opto-magnetic disk data storing media 110a and 210a carrying stored data.

When copying the data on these two media on a common opto-magnetic disk medium, image identification data after copying and synthesis are synthesized and managed on directory 317 for a directory produced for a plurality of data storing media is provided with own image identification codes.

As has been shown, in the above fourth and following embodiments it is possible to obtain designation of a character of retrieval data based on image, and thus retrieval operation can be executed under the sense of the operator. In addition, the operator can easily register index data, thus facilitating the management of the retrieval apparatus and permitting a retrieval system based on the operators creative sense to be readily built. Further, it is possible to reduce memory for storing the relation between index data and retrieval data, thereby greatly improving the retrieval speed.

Now, the operation at the time of stamp registration will be described by using display screen.

Figure 28:
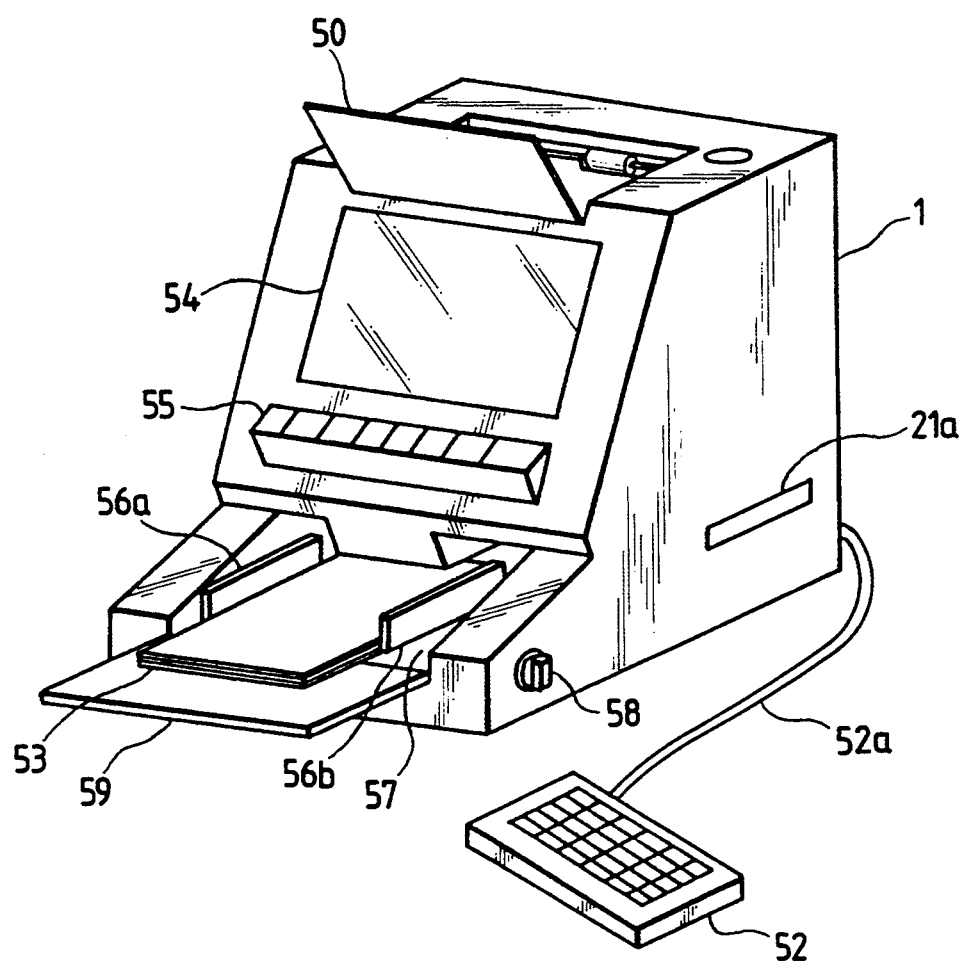
FIG. 28 is a perspective view showing an electronic data filing apparatus, to which the invention is applicable.

FIG. 28 is a perspective view showing an embodiment of the invention.

This embodiment comprises keyboard 52 for providing operation commands to control electronic data filing apparatus 1 and receiving character and numeral data, signal line 52a connecting electronic data filing apparatus 1 and keyboard 52, plate-like display 54 such as an electroluminescence, plasma or fluorescent display tube, key group 5, side plates 56a and 56b provided on original table 7 for transversal displacement relative thereto to restrict original 53 in transversal directions, switch knob 58 for switching between automatic feeding of a plurality of originals 53 and one-by-one manual feeding of originals, tray 59 for supporting originals 53 and discharging tray 50.

One side of electronic data filing apparatus is provided with opto-magnetic disk inlet 21a.

Figure 29:
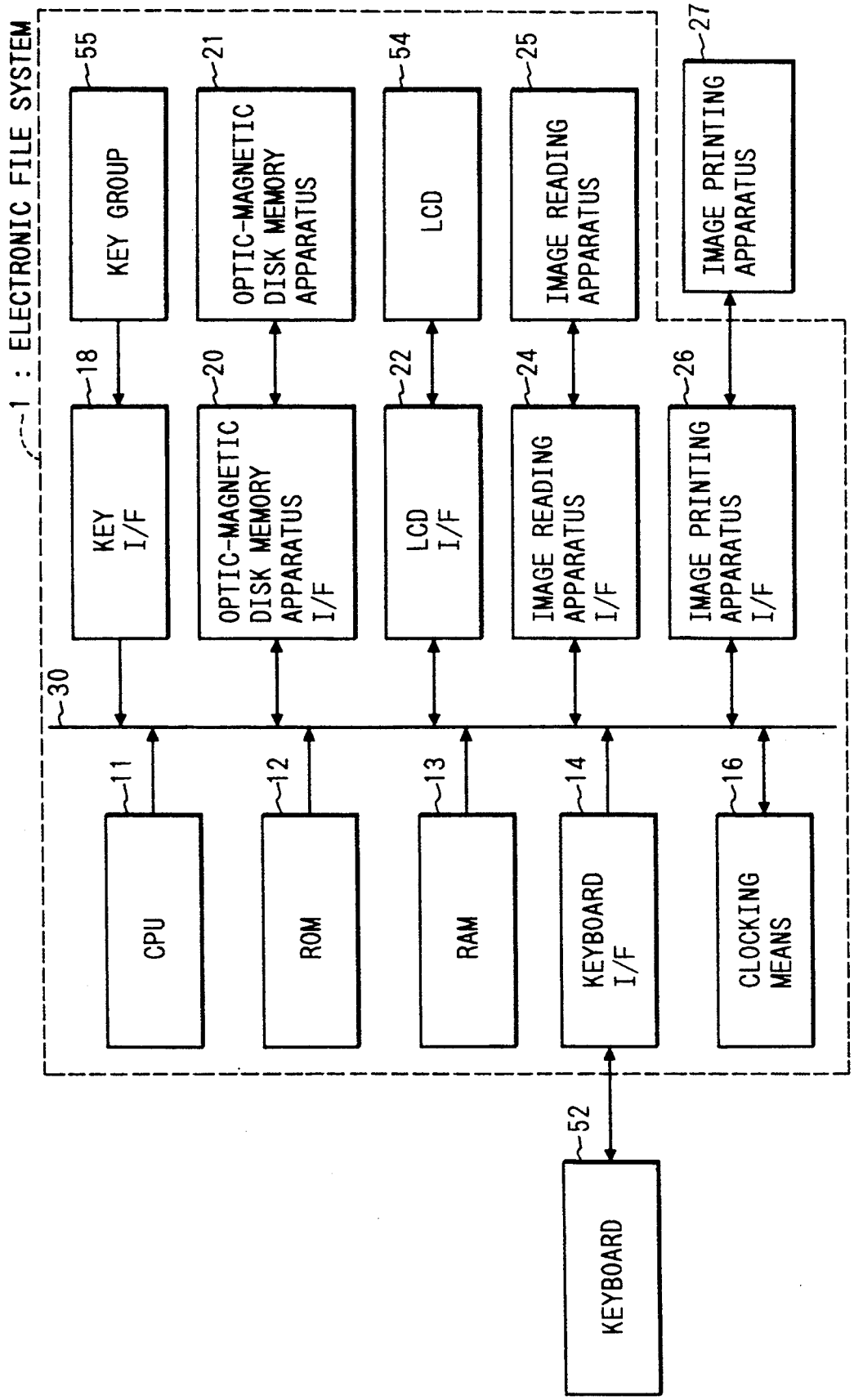
FIG. 29 is a block diagram showing the construction of an electronic data filing apparatus of the same embodiment.

FIG. 29 is a block diagram showing mainly the inner construction of electronic filing apparatus 1 in this embodiment.

Electronic filing apparatus 1 includes CPU 11 for controlling entire electronic filing apparatus 1, ROM 12 in which programs for the flow charts shown in FIGS. 31 to 34 are stored, RAM 13 used as work memory or the like keyboard interface 14 for keyboard 52, clocking means 16 for counting data and time, key interface 18 for key group 55, opto-magnetic disk memory apparatus 21 for storing image data or the like on an opt-magnetic disk, opto-magnetic disk memory apparatus interface 20, a LCD as an example of display 54, LCD interface 22, image reading apparatus 25, image reading apparatus interface 24 and printing apparatus interface 26. Electronic filing apparatus 1 is connected to keyboard 52 and image printing apparatus 27.

Figures 3, 30:
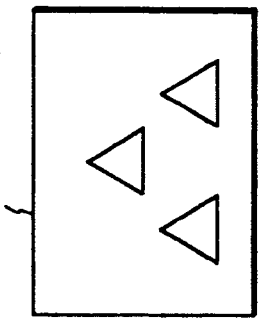
Figures 5, 30:
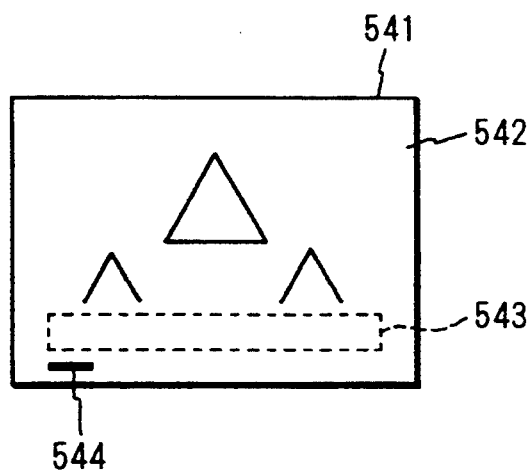
Figures 6, 30:
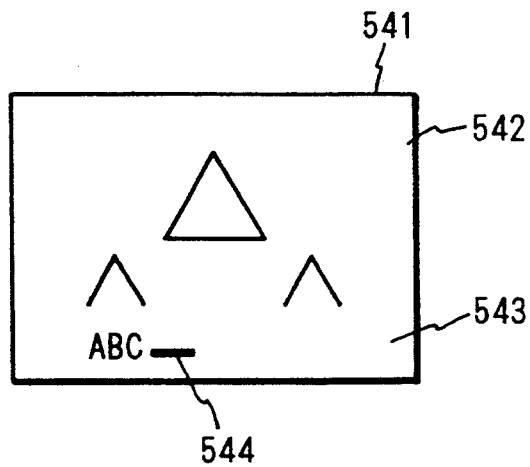

Now, an operation of the embodiment will be described. FIGS. 30-1 to 30-6 are views showing examples of various states of display 54 in the embodiment.

After closure of the power source of electronic data filing apparatus 1, by confirming the present date displayed on display 54 and setting disk, initial display is provided.

By selecting a stamp registration mode in the initial display, a display as shown in FIG. 30-1 is produced to be ready for selection of the kind of input stamp.

In this embodiment, the "stamp" means a retrieval image representing retrieval data, and it is possible to provide a plurality of stamps as retrieval data to one image. The stamp may be a car mark, a mountain mark, book mark, pencil mark, etc.

A kind of stamp among character stamps constituted by sole characters, drawing stamps constituted by sole drawings and compound stamps constituted by combinations of characters and drawings, is selected by using keys K1 to K3.

FIG. 30-2 shows a state, which is provided by selecting drawing stamp in the display of FIG. 30-1 with key K1, and in which an example of drawing stamp candidate is displayed in finder 541 of display 54. In this Figure, a stamp is displayed only in stamp display area K(3,2) and nothing is displayed in the other stamp display areas. On display 54, stamp display areas K(1,1) to K(4,5) are set in a matrix form.

For displaying a stamp in a stamp display area, one of stamp display areas K(1, 1) to K(4, 5) has to be selected by depressing a corresponding one of keys K1 to K5.

FIG. 30-3 shows a state with stamp display area K(1, 2) selected by depressing key K2 once. This stamp display area K(1, 2) is inverted (the inverted display state being shown shaded in FIG. 30-3. By depressing decision key K6 in the state of FIG. 30-3, the selected stamp display area K(1, 2) is decided, and the stamp candidate displayed in finder 541 is displayed in this decided stamp display area K(1, 2). This state is shown in FIG. 30-4. Then, by depressing key K2 in the state with stamp display area K(4, 2) selected, the stamp selection state of this column is cancelled.

Now, a specific operation of the embodiment will be described.

Figure 31:
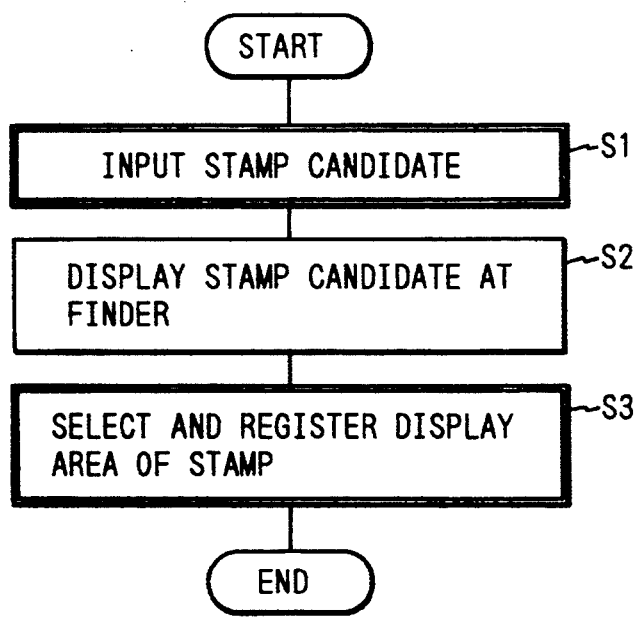
FIG. 31 is a flow chart illustrating a basic operation of stamp registration in the same embodiment.

FIG. 31 is a flow chart illustrating an operation of newly registering stamp in the embodiment.

First a stamp candidate original is set in image reading apparatus 25, or a stamp candidate is input as key input from keyboard 52 (step S1). The input stamp candidate is displayed in equal or reduced scale in finder 541 of display 54 (step S2). Then a stamp display area displaying the stamp candidate is selected with keys K1 to K5, and the stamp candidate is registered in the selected stamp display area (step S3). By repeating this operation, stamps are displayed in all or part of stamp display areas K(1, 1) to K(4, 5) shown in FIG. 30-2.

Figure 32:
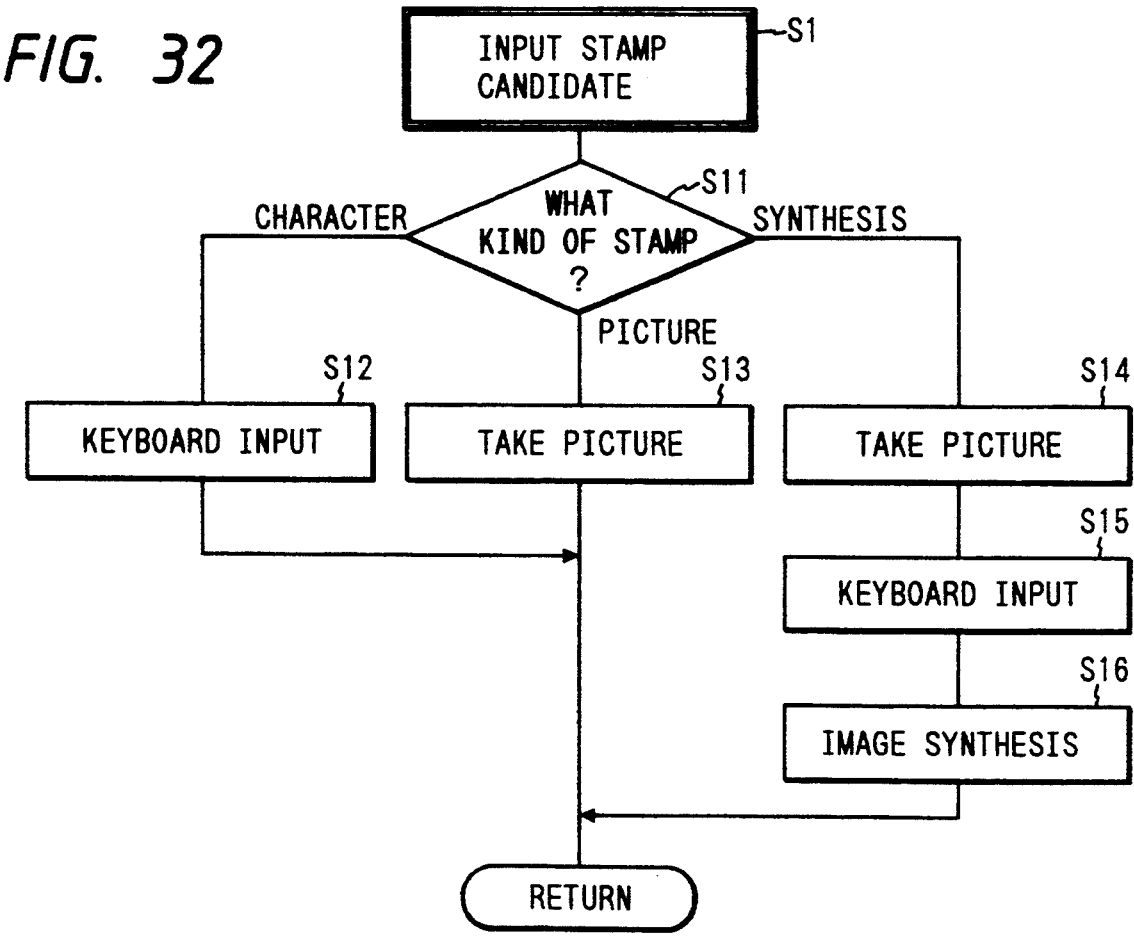
FIG. 32 is a flow chart illustrating a stamp candidate input operation in the same embodiment.

FIG. 32 is a flow chart illustrating an example of stamp candidate input operation in the embodiment.

In this embodiment, three different stamps can be registered. There are three different kinds of stamps, i.e., character stamps consisting of sole characters, drawing stamps consisting of sole drawings, and combination stamps consisting of combinations of characters and drawings.

When character stamp is selected with key K1 in FIG. 30-1 (step S11), a desired character or character row is input (step S12). When drawing stamp is selected with key. K2 in FIG. 30-1, a picture of a given original is taken with image reading apparatus 25 (step S13). This picture (i.e., image) is used as stamp.

When a combination stamp is selected with key K3 in FIG. 30-1, a picture of original is taken by image reading apparatus 25 (step S14), and a desired character is input from keyboard 52 (step S15). CPU 11 synthesizes character and drawing (step S16).

Finder 541 of display 54, as shown in FIG. 30-5, has drawing display area 542 and character display area 543. In drawing display area 542 a drawing (or image) taken by image reading apparatus 25 is displayed, and in character display area 543 a character input from keyboard 52 is displayed.

When a drawing/character synthesis mode for synthesizing drawing and character is selected (step S11), a picture of a given original is taken by image reading apparatus 25, and this drawing (i.e., image thereof) is displayed on drawing display area 542. Together with the drawing, cursol 544 is displayed under finder 541. By displacing cursol 544 in a predetermined portion and depressing a space key on keyboard 52, a blank in FIG. 3-5 (shown by dashed rectangle) is provided. This blank portion is used as character display area 543. By inputting character to the blank portion from keyboard 52, the input character, for instance "ABC" as shown in FIG. 30-6, is displayed in character display area 543. In this way, a desired drawing/character synthesis stamp is displayed in finder 541.

In the drawing/character synthesis mode, the input character, such as "ABC", is stored in terms of codes in RAM 13. When character is displayed in finder 541 or stamp display areas K(1, 1) to K(4, 5), its code is displayed after conversion to character font by a font memory provided in ROM 12. Where characters are stored in terms of codes in this way, these characters may be used in the same way as other retrieval data. Where drawing and character are stored as an image, stamp management can be facilitated, and there is no need of providing any font memory for stamps.

Where drawing/character combination stamps are used, the retrieval operation can be facilitated for these stamps are very concrete and objective.

A stamp which is prepared in the above way is displayed as stamp candidate in finder 541 of display 54. If such a stamp candidate is desirable (i.e., if it is through by the operator to be satisfactory), step S3 for stamp display area selection and stamp registration is executed. If the stamp candidate is unsatisfactory, the routine goes back to stamp candidate input step S1 for preparing stamp candidate afresh.

Since the prepared stamp candidate is displayed once in finder 541 before it is displayed in an actual stamp display area, the prepared stamp candidate can be readily altered, and a desired stamp can be readily produced.

Figure 33:
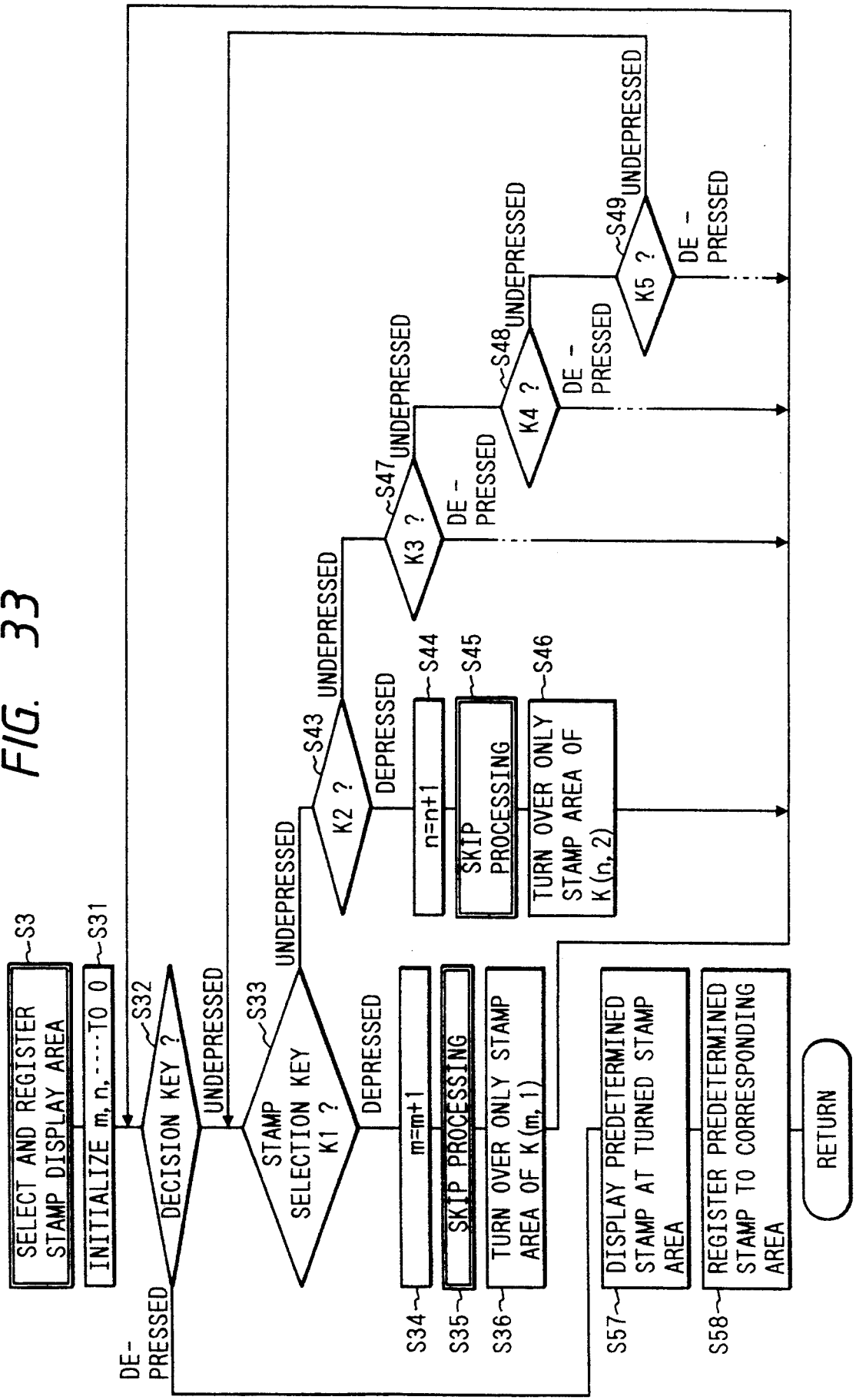
FIG. 33 is a flow chart illustrating a stamp display area selection operation and a stamp registration operation in the same embodiment.

FIG. 33 is a flow chart illustrating an example of operations of stamp display area selection and stamp candidate registration (step S3) in the embodiment.

First, it is assumed that a stamp candidate finder display screen shown in FIG. 30-2 is produced on display 54, and a stamp candidate consisting of three triangles is displayed.

In this case, variables m, n, . . . are initialized to zero (step S31). Then, if display area selection key K1 is depressed (step S33), variable m is incremented, and stamp display area is selected and displayed with inversion display of only stamp display area K(m, 1) (step S36). If decision key K6 is depressed at this time (step S32), the selected stamp display area is decided, and the stamp candidate shown in finder 54 is displayed in the decided stamp display area (step S57) and registered in the stamp display area. This stamp image is recorded in the retrieval data memory area by opto-magnetic disk memory apparatus 21 (step S58). Skipping process (step S35) will be described later.

When display area selection key K2 is depressed (step S43), variable n is incremented by one (step S44), and stamp display area K(n, 2) is inverted (step S46).

FIG. 30-3 is a view showing a state with stamp display area K(1, 2) selected by depressing display area selection key K2 once. When stamp display area K(1, 2) is selected, it is inverted (as shown shaded in FIG. 30-3). When decision key K6 is depressed (step S32), the selected stamp display area is decided, and the stamp candidate is displayed in the decided stamp display area (step S57).

FIG. 30-4 is a view showing an example of display of the stamp candidate in stamp display area K(1, 2).

Variables m, n show rows in the stamp display area matrix shown in FIGS. 30-2 to 30-4. Represented by p, q and r are variables representing rows of matrix corresponding to display area selection keys K3 to K5.

Display area selection keys K3 to K5 are the same as described above, and whether they are depressed is checked (steps S47 to S49). If they are depressed, variables p, q and r representing rows are each incremented by one, and selection display of stamp display areas belonging to the respective display area keys is shifted down by one row. If decision key K6 is depressed, stamp is displayed in the selected position.

With the provision of display area selection keys for one row, it is possible to ensure reliable display area selection key selection, and thus it is possible to reduced the number of display area selection keys and facilitate the stamp area selection operation.

Figure 34:
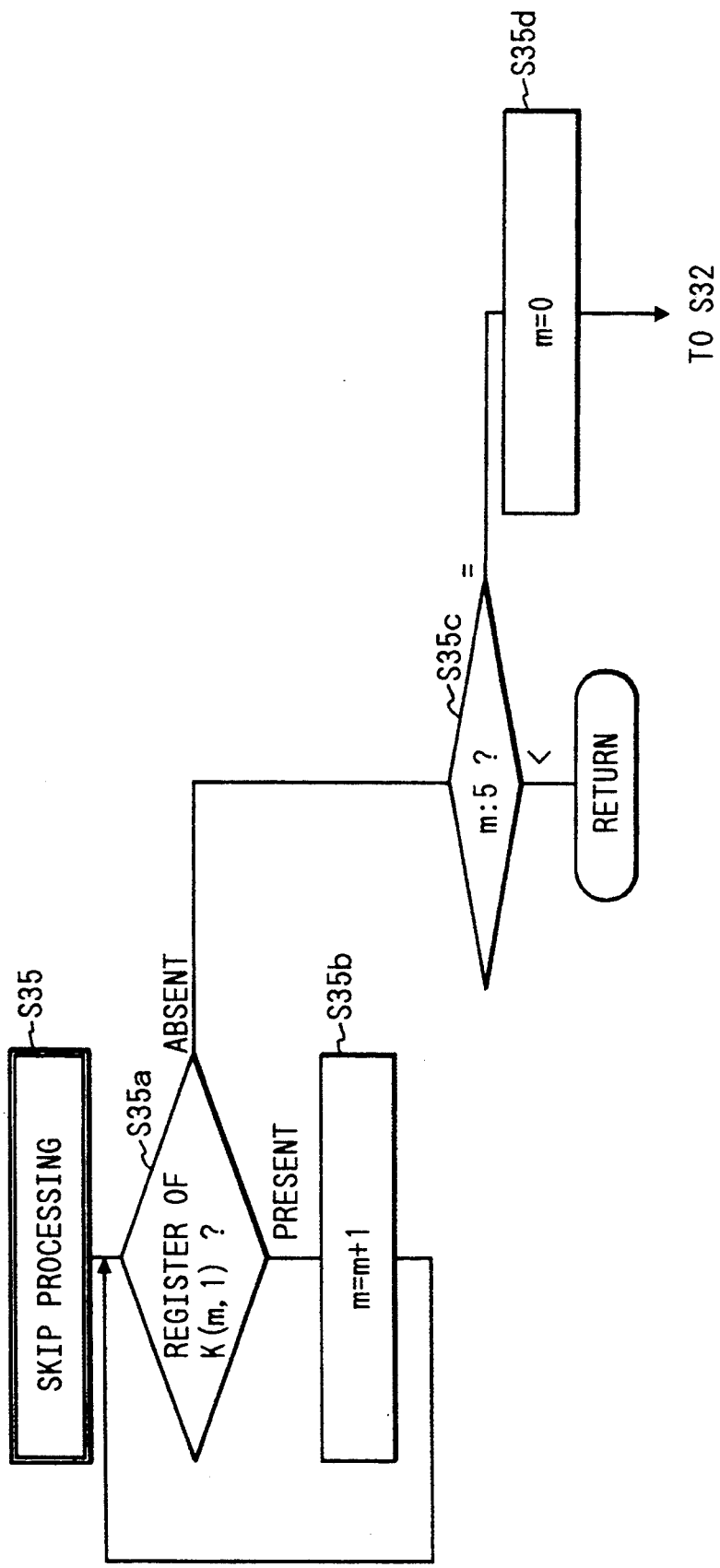
FIG. 34 is a flow chart illustrating a skipping operation in the same embodiment.

FIG. 34 is a flow chart showing an example of operation of skipping stamp display area selection in the embodiment.

When selecting a stamp display area, whenever a display area selection key is depressed once, a selection display of the stamp display area is shifted down by one row. If stamp is already registered (i.e., displayed) in the stamp display area determined as a result of the display shift (step S35a), this display area is skipped. That is, variable m is incremented by one further (step S35b), thereby selectively displaying next but one stamp display area. If display area selection key K2 is depressed once with stamp display area K(2, 2) in selection display, the next stamp display area is K(3, 2). In this area a spade stamp has already been registered (i.e., displayed) as is seen with reference to the index area of RAM 13, and thus next display area K(4, 2) is displayed as selection display. If the next but one stamp is displayed, the next but two stamp display area is selected for selection display. When variable m becomes 5 greater than its maximum number (step S35c), it is initialized to zero (step S35d), and the routine returns to step S32.

While FIG. 34 illustrates a skipping process mainly with respect to stamp display areas K(1, 4) to K(4, 1), the same operation applies to stamp display areas K(1, 2) to K(4, 2) as well. That is, skipping step S45 is the same as step S35 except for that variable n is used instead of variable m in step S35. An operation when stamp display area selection keys K3 to K5 is depressed is the same as in the case of FIG. 34.

It is possible to omit operation of stamp candidate display in finder 541 (step S2) in the embodiment.

The registered stamp is provided as index to image data in the manner as described before.

Now, an operation of retrieval of given image with use of stamp will be described.

FIG. 30-7 shows a retrieval mode display with a plurality of stamps displayed. A desired one of these stamps is selected. These stamps are transferred from opto-magnetic disk to RAM 13 when the disk is set. For the selection, one of keys K1 to K5 is depressed. As a result, one of stamps belonging to the depressed key (i.e., five stamps displayed above the depressed key) is turned by one-third turn to be tentatively selected. Every time the same key is depressed once, the one-third turn display position of the stamps belonging to that key is shifted down by one row. When decision key K6 is depressed in this process, the stamp having been turned by one-third turn is selected and completely turned. Image corresponding to the selected stamp is retrieved and read out from opto-magnetic disk by opto-magnetic disk memory apparatus 21 to be displayed on display 54 and also be printed by image printing apparatus 27 under control of a printing command.

What is claimed is:

1. A filing method for an electronic filing apparatus, said method comprising the steps of:
  (a) reading out index images from an index image storage means and displaying the readout index images on display means having a plurality of display locations, each of the index images being an image representative of index information used for retrieving image information stored in a storage medium and capable of being used as index information for a plurality of image information;
  (b) selecting desired index images from among the plurality of index images displayed at the plurality of display locations;
  (c) inputting the image information to be stored in the storage medium;
  (d) storing the image information input in step (c) in a vacant area of the storage medium; and
  (e) forming an index file indicating a relationship between the selected index images selected in step (b) and a storage address of the image information stored in the storage medium in step (d).

2. A method according to claim 1, wherein the index images stored in the index image storage means are provided by reading out the index images from a predetermined area of the storage medium and then storing the read-out index images in the index image storage. means.

3. A method according to claim 1, wherein the image information input in step (c) is an image read by an image reading device.

4. A method according to claim 1, further comprising a step of (f) storing the formed index file in the storage medium.

5. A method of forming an index for an electronic filing apparatus, said method comprising the steps of:
  (a) setting an index image registration mode for registering an index image, the index image being an image representative of index information for retrieving image information to be stored in a storage medium and capable of being used as index information for a plurality of image information;
  (b) inputting an original image for forming the index image;
  (c) forming the index image by using the original image input in step (b);
  (d) selecting a display location at which the index image formed in step (c) is to be displayed on display means, from among a plurality of display locations of the display means; and (e) storing the index image formed in step (c) and displaying the stored index image at the display location selected in step (d); and (e) registering the displayed index image as an index for retrieval.

6. A method according to claim 5, further comprising a step of storing the index image stored in the index image storage means in a predetermined area of the storage medium.

7. A method according to claim 5, wherein in step (c), the index image is formed by reducing the input original image.

8. A method according to claim 5, wherein in step (d), the selection of a display location is inhibited during display of the index image.

9. An electronic filing apparatus comprising:

mode setting means for setting an index image registration mode for registering an index image, the index image being an image representative of index information used for retrieving image information to be stored in a storage medium and capable of being used as index information for a plurality of image information;

input means for inputting an original image for forming the index image;

forming means for forming the index image by using the original image input by said input means;

display means having a plurality of display locations for displaying the index image;

selection means for selecting a display location at which the index image formed by said forming means is to be displayed, from among the plurality of display locations of said display means; and control means for controlling said display means to display the index image formed by said forming means at the display location selected by said selection means.

10. An apparatus according to claim 9, wherein said control means stores the index image stored in said storage means, in said storage medium.

11. An apparatus according to claim 9, wherein said forming means forms the index image by reducing the original image input by said input means.

12. An apparatus according to claim 9, wherein said selection means inhibits to select the display location where the index image has already been displayed.

13. An apparatus according to claim 9, wherein said display means further comprises a monitor for temporarily displaying the original image input by said input means.

14. An electronic filing apparatus comprising:

a memory that stores index images, each of the index images being an image representative of index information used for retrieving image information to be stored in a storage medium and capable of being used as index information for a plurality of image information;

display means having a plurality of display locations for displaying the plurality of index images stored in said memory;

selection means for selecting desired index image from among the plurality of index images displayed at said plurality of display locations;

input means for inputting the image information to be stored in said storage medium;

storage control means for causing the image information input by said input means in a vacant area of said storage medium; and forming means for forming an index file indicating a relationship between the index image selected by said selection means and a storage address of the image information stored in said storage medium.

15. An apparatus according to claim 14, wherein said memory stores the plurality of index images prestored in a predetermined area of said storage medium.

16. An apparatus according to claim 14, wherein said input means inputs an image read by an original reading apparatus.

17. An apparatus according to claim 14, wherein said storage control means causes the formed index file to be stored in said storage medium.

* * * * *

UNITED STATES PATENT AND TRADEMARK OFFICE
CERTIFICATE OF CORRECTION

PATENT NO. : 5,363,504
DATED : November 8, 1994
INVENTOR(S) : Kamon Hasuo

It is certified that error appears in the above-indentified patent and that said Letters Patent is hereby corrected as shown below:

On the title page, item

[56] REFERENCES CITED

Foreign Application Priority Data
Insert: --FOREIGN PATENT DOCUMENTS
    61-26147    2/1986 Japan.
    62-272365 11/1987 Japan.
    63-4334    1/1988 Japan.--

COLUMN 2

Line 34, "disk" should read --a disk--.

COLUMN 3

Line 31, "circuit 19" should read --circuit 18--.
Line 68, "original" should read --an original--.

COLUMN 4

Line 10, "circuit 23." should read --circuit 22.--.
Line 12, "as" should read --an--.
Line 34, "own" should read --its own--.

COLUMN 5

Line 23, "peculier" should read --peculiar--.
Line 39, "own" should read --its own--.
Line 67, "actual disk," should read --an actual disk--.

UNITED STATES PATENT AND TRADEMARK OFFICE
CERTIFICATE OF CORRECTION

PATENT NO. : 5,363,504  
DATED : November 8, 1994  
INVENTOR(S) : Kamon Hasuo

It is certified that error appears in the above-indentified patent and that said Letters Patent is hereby corrected as shown below:

COLUMN 6

Line 34, "this" should read --this,-- and conceivable;" should read --conceivable:--.

COLUMN 8

Line 6, "list" should read --or a list--.  
Line 12, "conditions" should read --attention--.

COLUMN 9

Line 14, "name of" should read --name or--.  
Line 31, "present data" should read --present date--.  
Line 35, "stored" should read --stored at--.  
Line 52, "own" should read --its own--.

COLUMN 10

Line 15, "own" should read --its own--.  
Line 23, "operators" should read --operator's--.  
Line 36, "electroluminescence," should read --electroluminscent,--.  
Line 57, "opt-magnetic" should read --opto-magnetic--.  
Line 65, "30-6" should read --30-7--.

UNITED STATES PATENT AND TRADEMARK OFFICE
CERTIFICATE OF CORRECTION

PATENT NO. : 5,363,504
DATED : November 8, 1994
INVENTOR(S) : Kamon Hasuo

It is certified that error appears in the above-indentified patent and that said Letters Patent is hereby corrected as shown below:

COLUMN 11

Line 63, "key.K2" should read --key K2--.
    Line 65, "stamp." should read --a stamp.--.

COLUMN 12

Line 14, "cursol 544" should read --cursor 544--.
    Line 15, "cursol 544" should read --cursor 544--.
    Line 17, "3-5" should read --30-5--.
    Line 40, "through" should read --thought--.

COLUMN 13

Line 27, "stamp" should read --a stamp--.
    Line 30, "reduced" should read --reduce--.
    Line 66, "(step $2)" should read --(step S2)--.

COLUMN 14

Line 2, "stamp" should read --stamps--.
    Line 24, "readout" should read --read-out--

UNITED STATES PATENT AND TRADEMARK OFFICE
CERTIFICATE OF CORRECTION

PATENT NO. : 5,363,504
DATED : November 8, 1994
INVENTOR(S) : Kamon Hasuo

It is certified that error appears in the above-indentified patent and that said Letters Patent is hereby corrected as shown below:

COLUMN 15

Lines 15-16, ";and (e) registering the displayed index image as an index for retrieval" should be deleted.

COLUMN 16

Line 27, "means" should read --means to be stored--.

Signed and Sealed this

Fourth Day of April, 1995

BRUCE LEHMAN

Attest:

Attesting Officer

Commissioner of Patents and Trademarks